Figure 24:
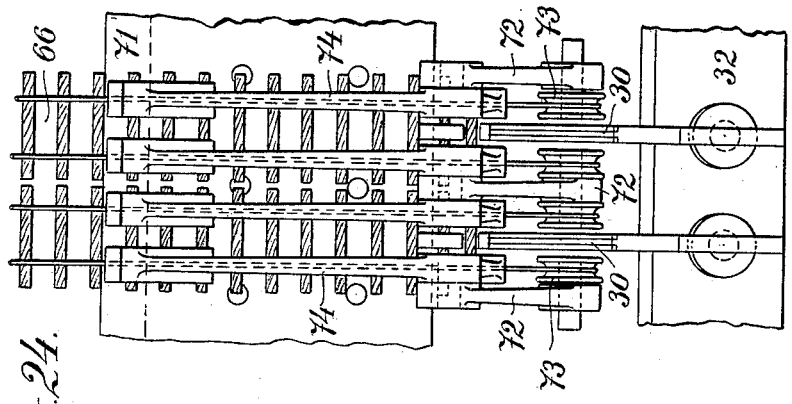

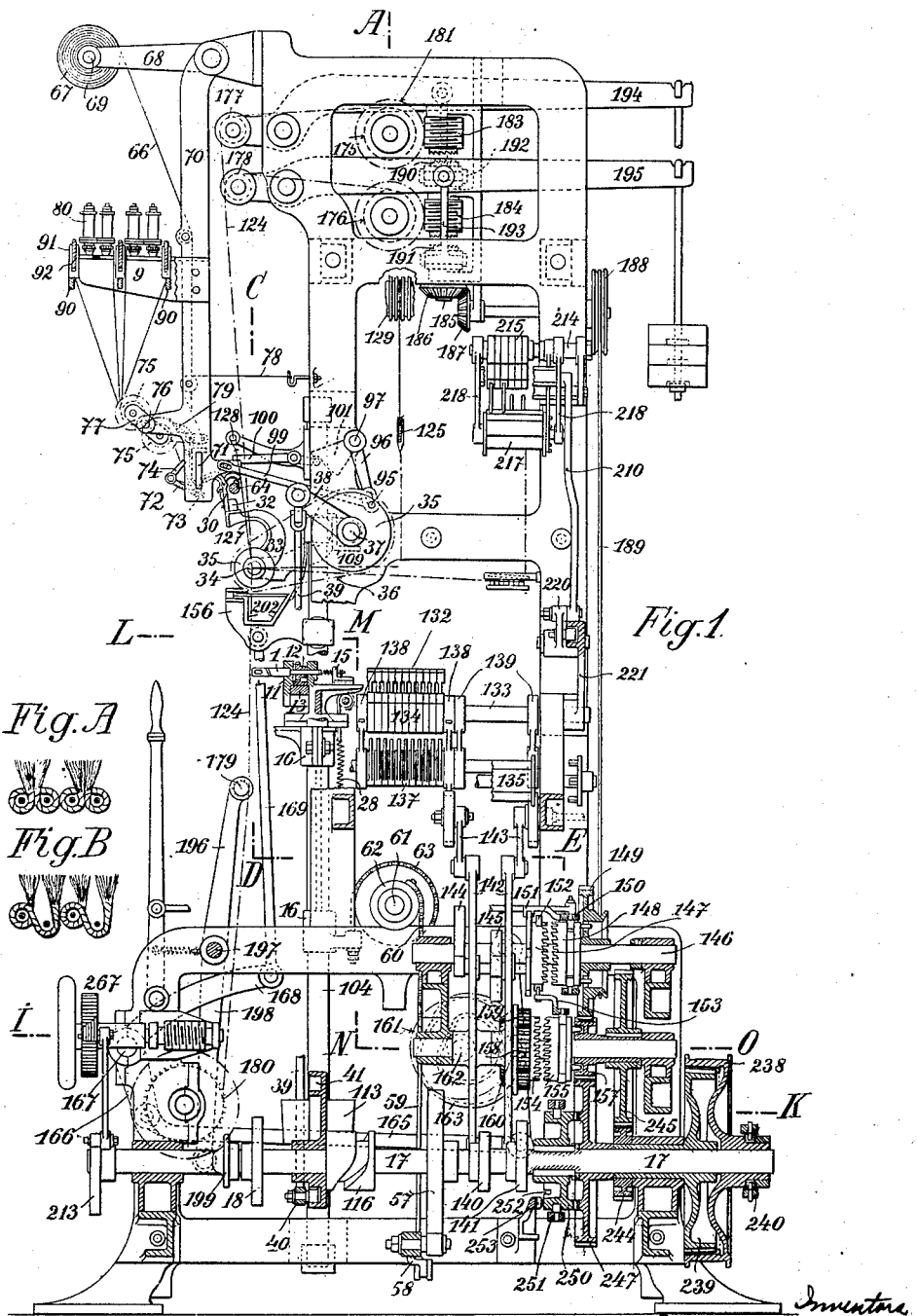

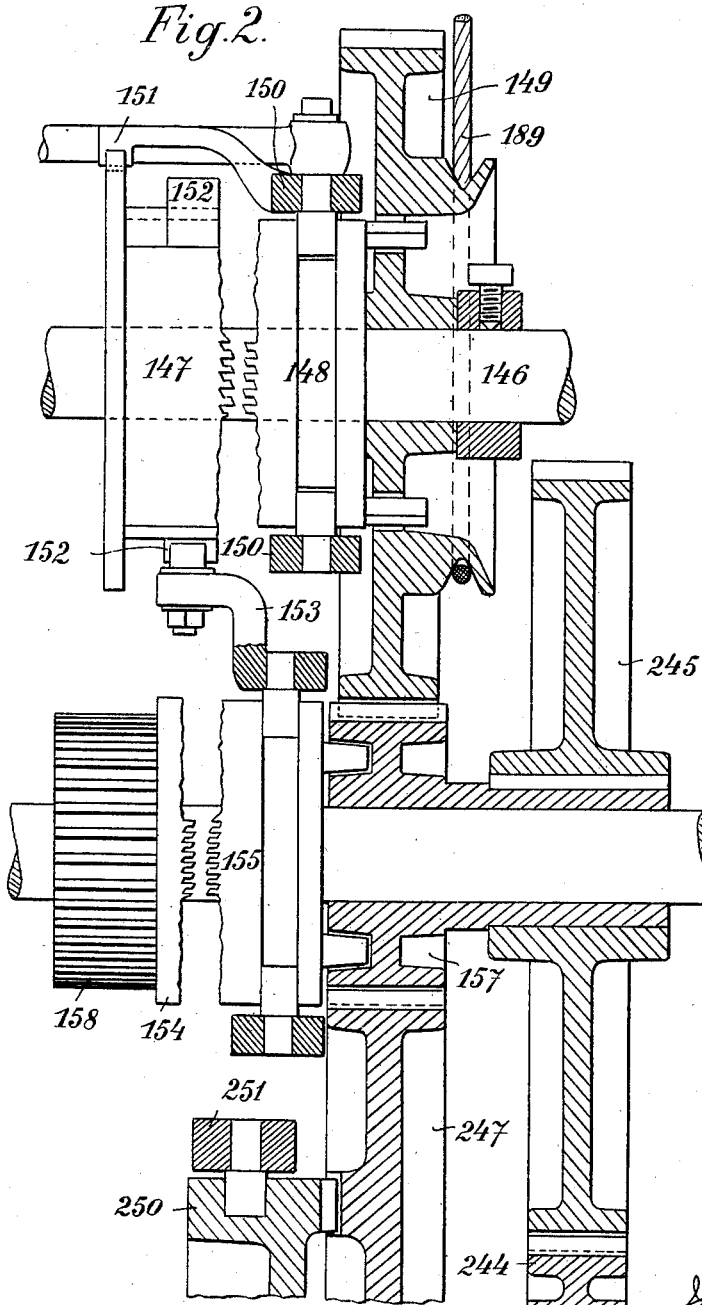

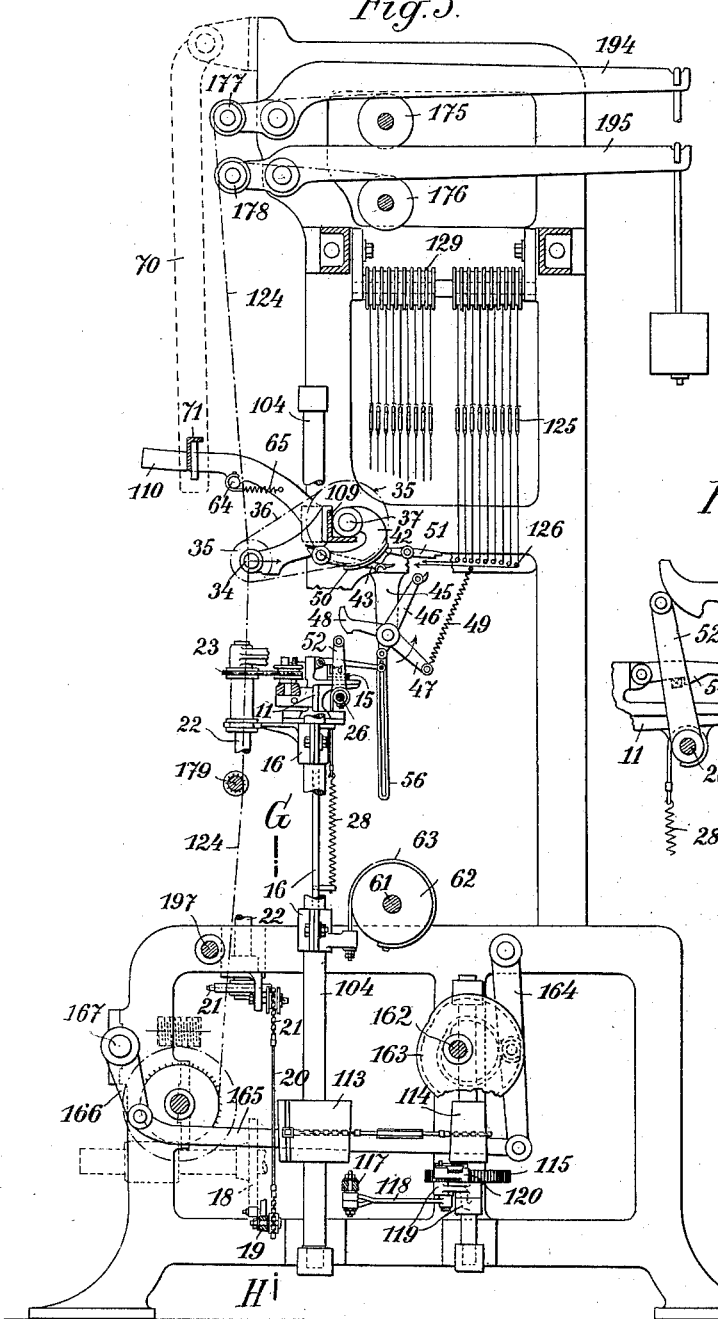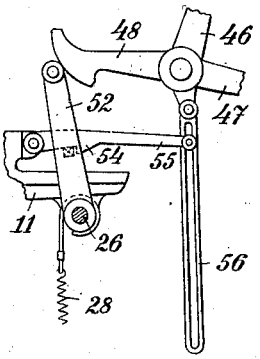

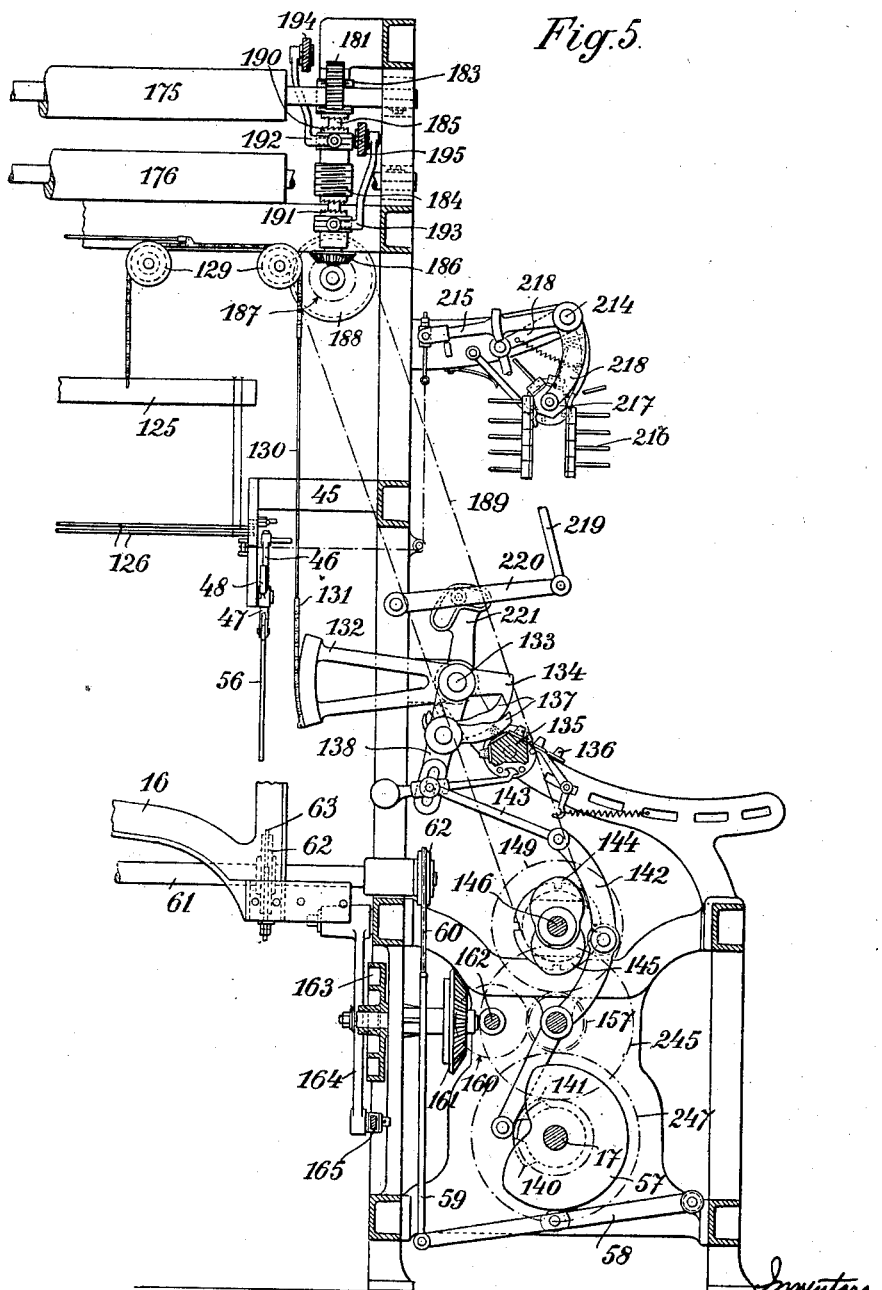

No. 732,216. PATENTED JUNE 30, 1903.
H. PANITSCHEK & J. AHORN.
LOOM FOR WEAVING PILE CARPETS.
APPLICATION FILED AUG. 19, 1899.
NO MODEL. 19 SHEETS—SHEET 5.
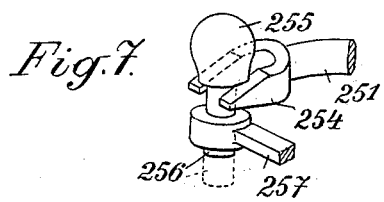
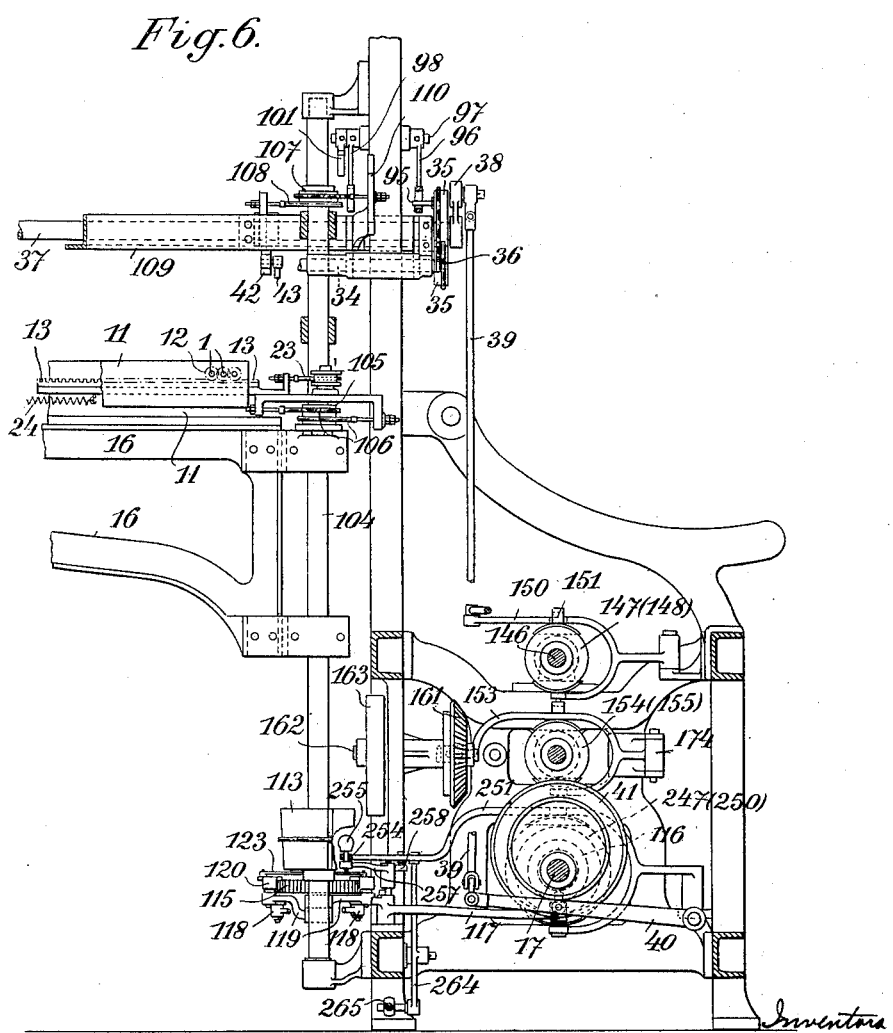

No. 732,216. PATENTED JUNE 30, 1903.
H. PANITSCHEK & J. AHORN.
LOOM FOR WEAVING PILE CARPETS.
APPLICATION FILED AUG. 19, 1899.
NO MODEL. 19 SHEETS—SHEET 6.

Fig. 8. Fig. 11. Fig. 10. Fig. 9.

Witnesses.

Inventors.
Heinrich Panitschek.
Johann Ahorn.
by
Atty.

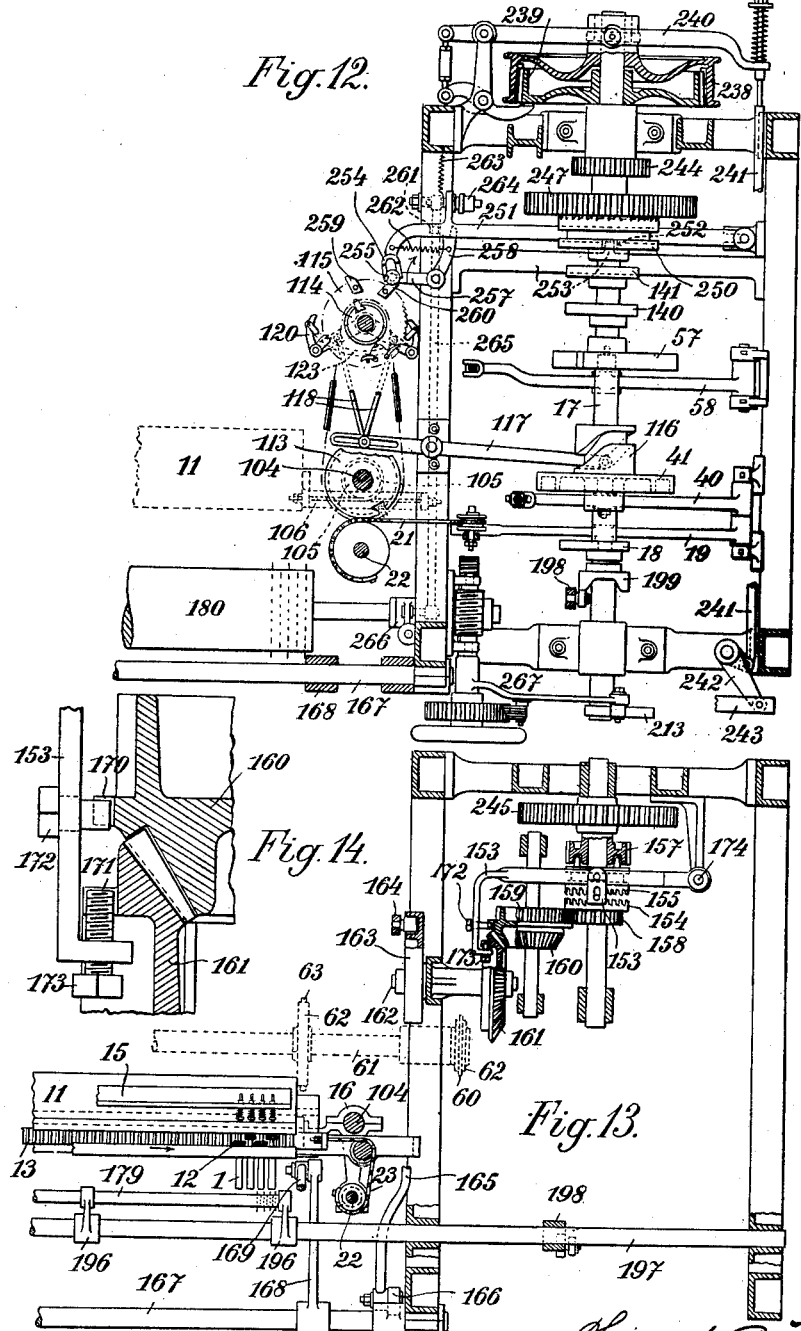

No. 732,216. PATENTED JUNE 30, 1903.
H. PANITSCHEK & J. AHORN.
LOOM FOR WEAVING PILE CARPETS.
APPLICATION FILED AUG. 19, 1899.
NO MODEL. 19 SHEETS—SHEET 8.
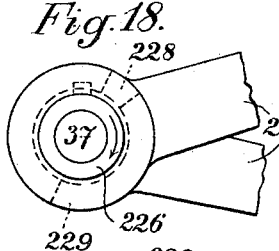
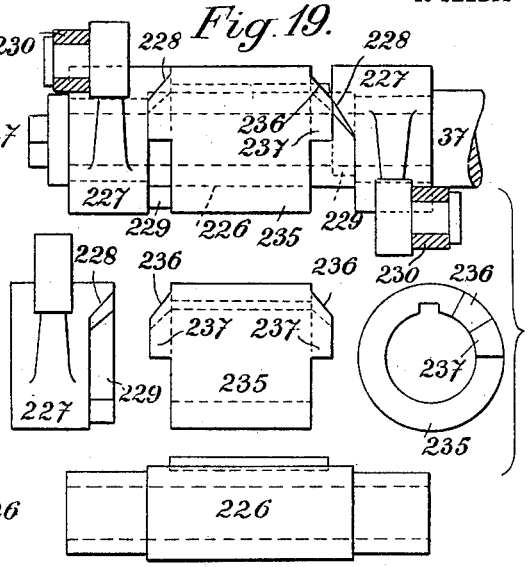
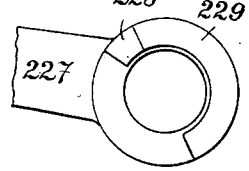
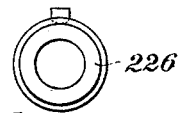
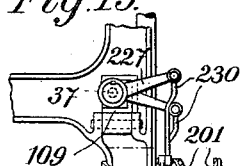
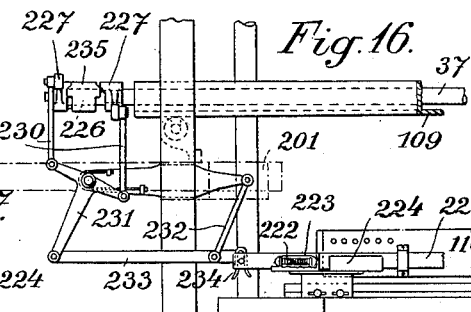
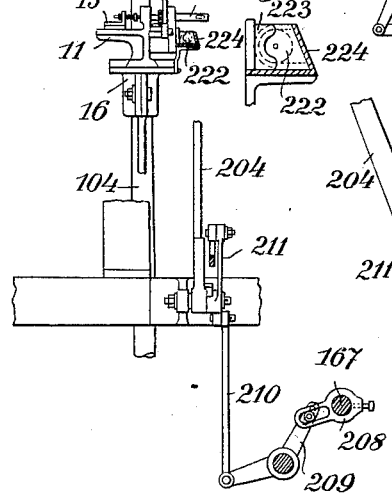
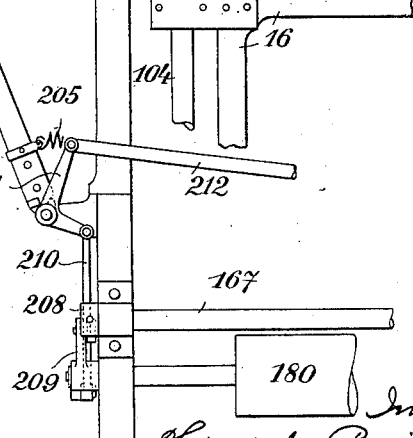

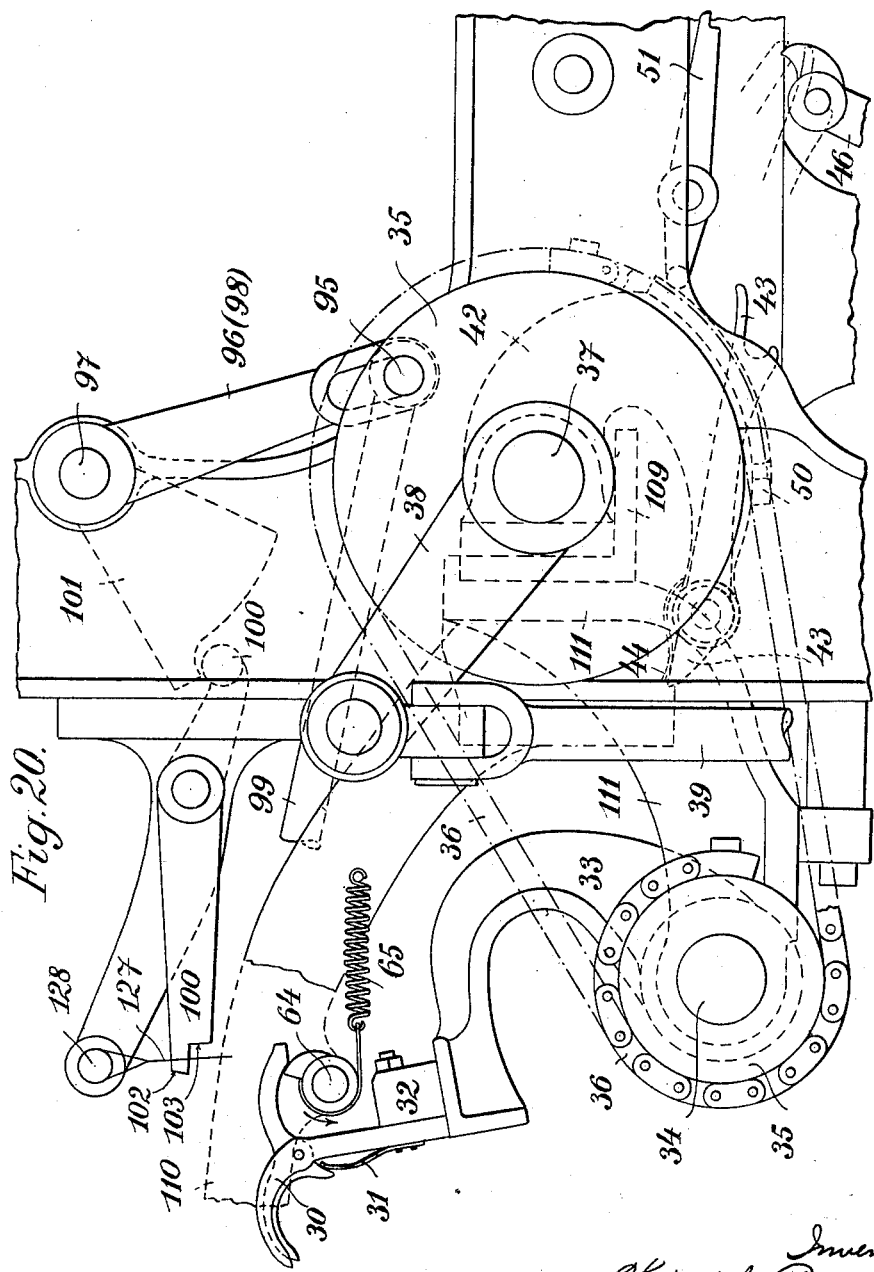

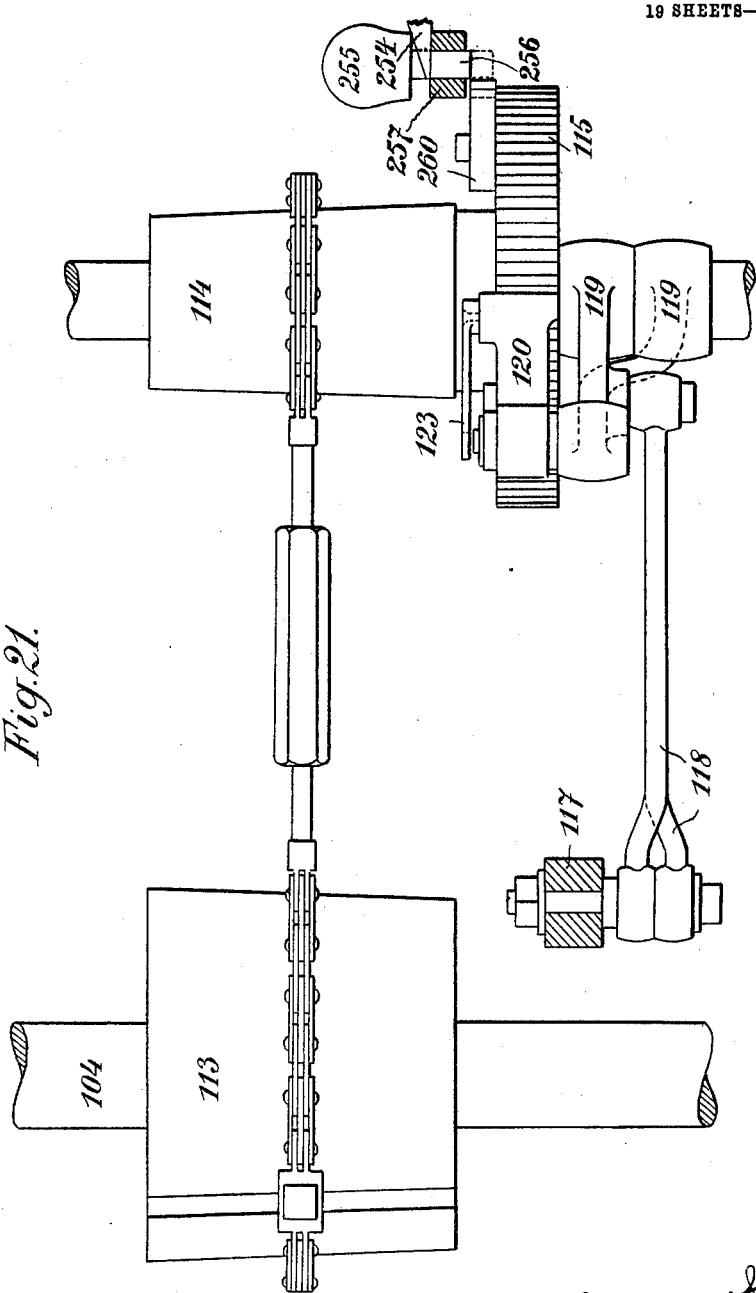

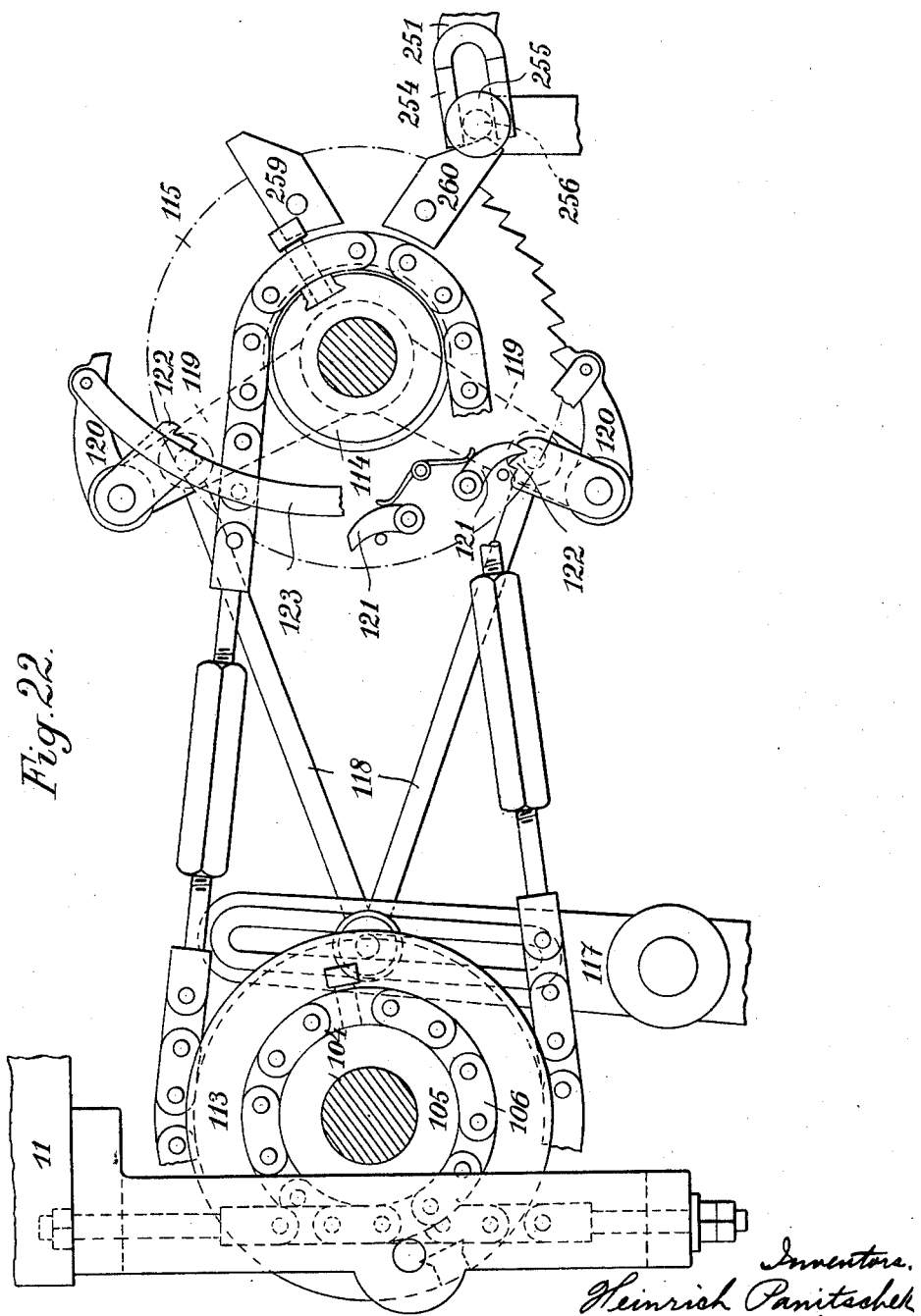

No. 732,216. PATENTED JUNE 30, 1903.
H. PANITSCHEK & J. AHORN.
LOOM FOR WEAVING PILE CARPETS.
APPLICATION FILED AUG. 19, 1899.
NO MODEL.
19 SHEETS—SHEET 12.

No. 732,216. PATENTED JUNE 30, 1903.
H. PANITSCHEK & J. AHORN.
LOOM FOR WEAVING PILE CARPETS.
APPLICATION FILED AUG. 19, 1899.
NO MODEL. 19 SHEETS—SHEET 13.
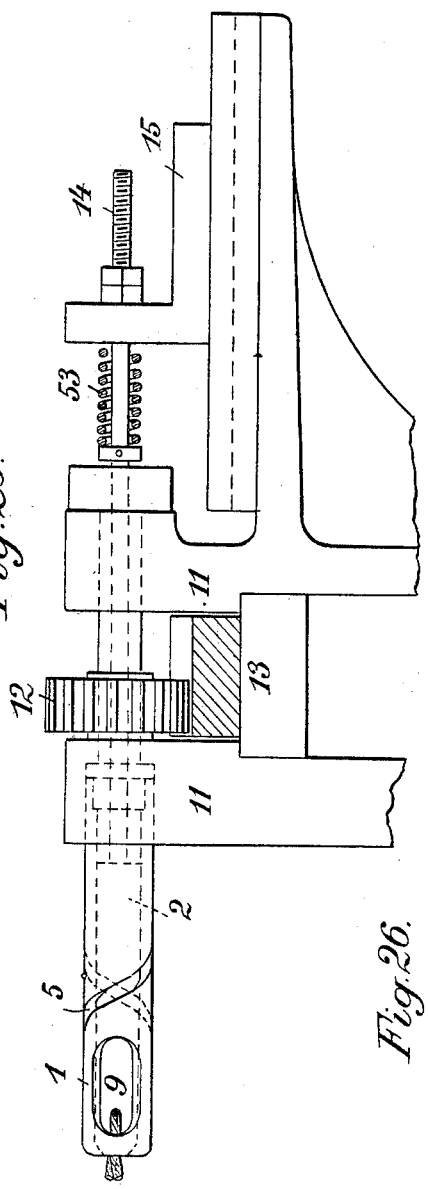
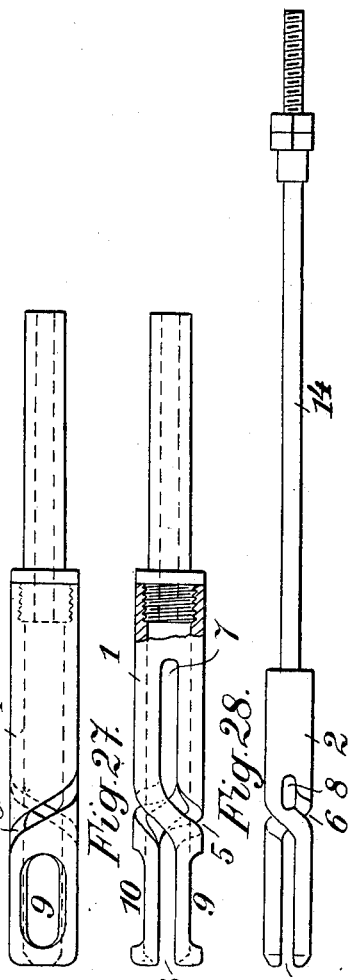

No. 732,216. PATENTED JUNE 30, 1903.
H. PANITSCHEK & J. AHORN.
LOOM FOR WEAVING PILE CARPETS.
APPLICATION FILED AUG. 19, 1899.
NO MODEL. 19 SHEETS—SHEET 14.
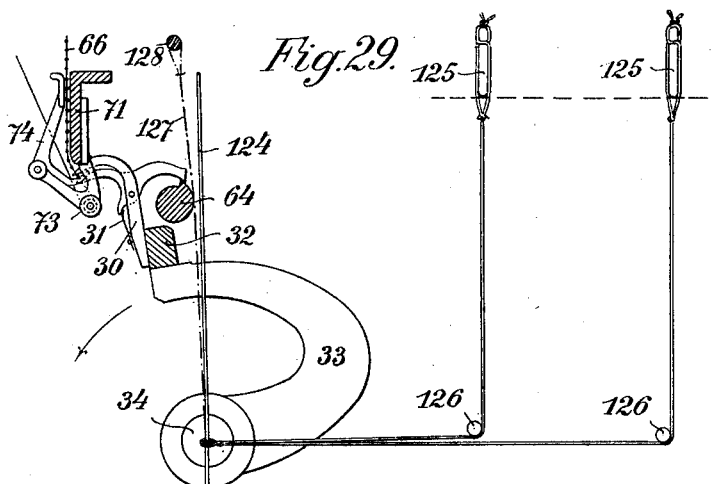
Fig.29.
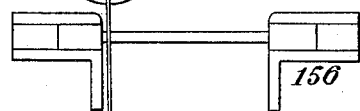
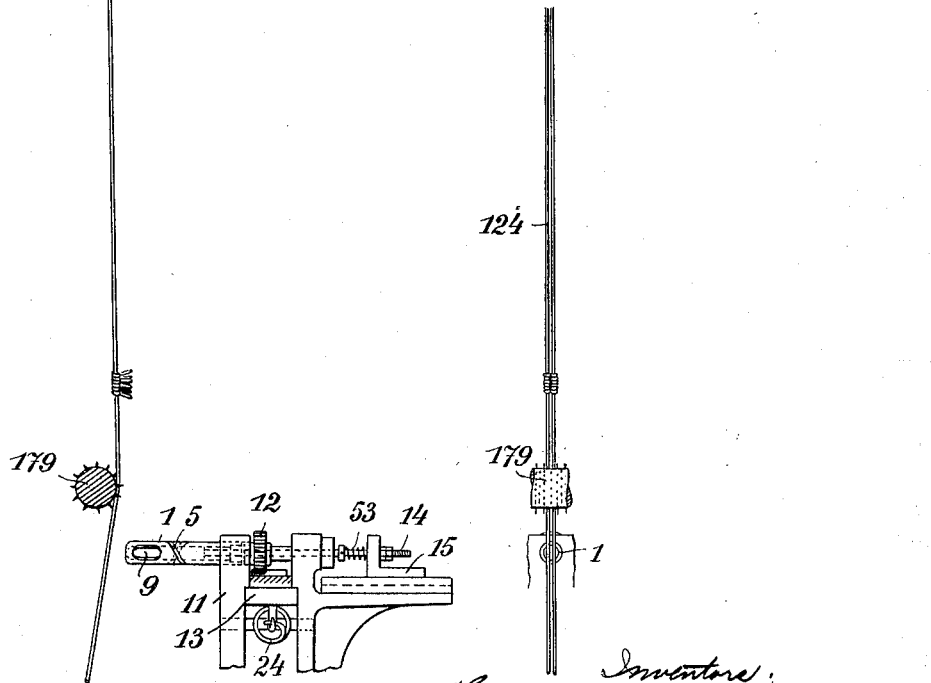
Fig.35.

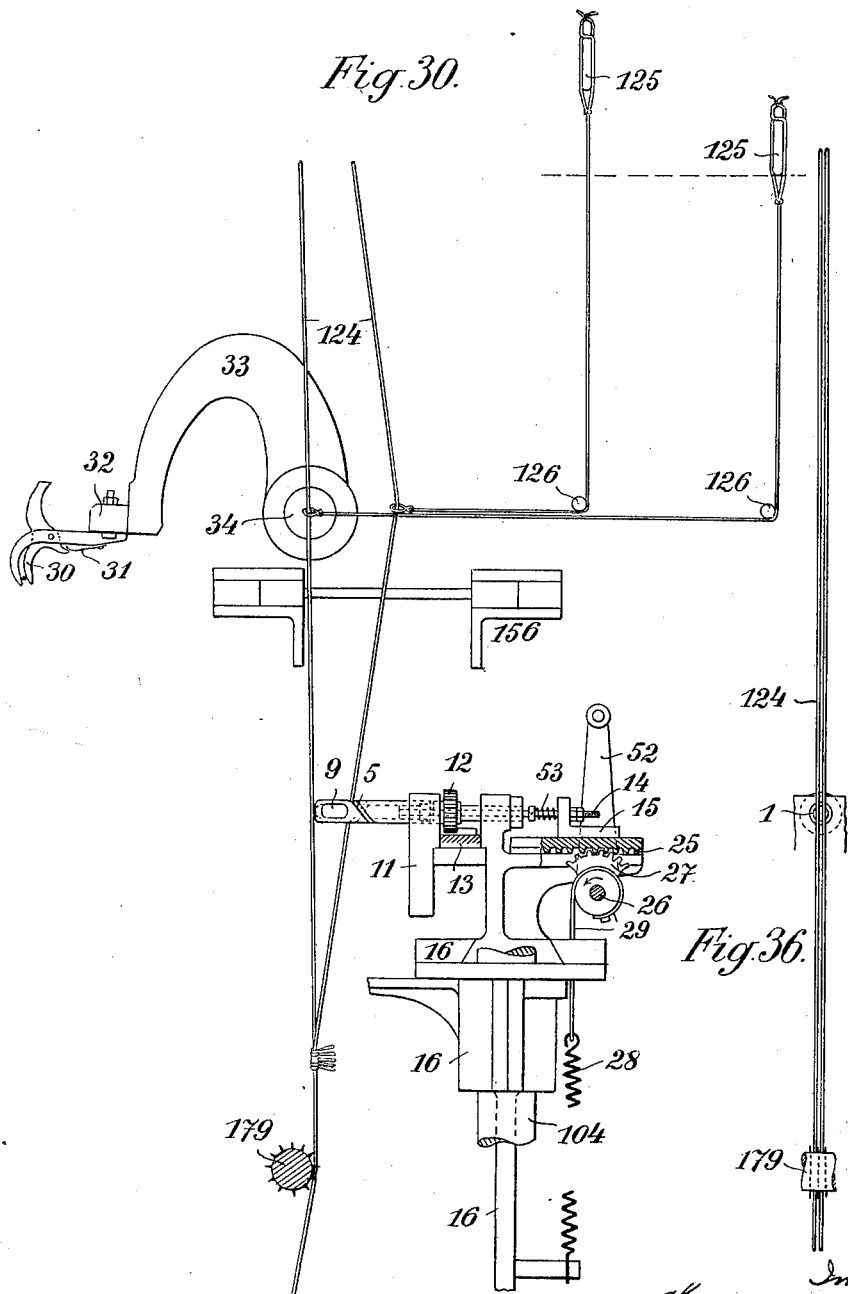

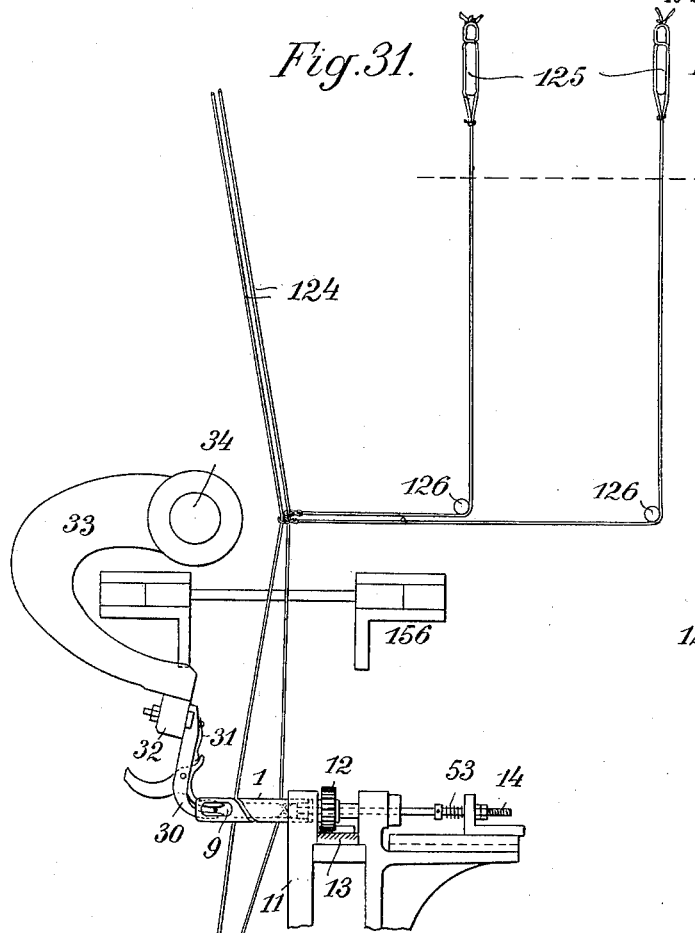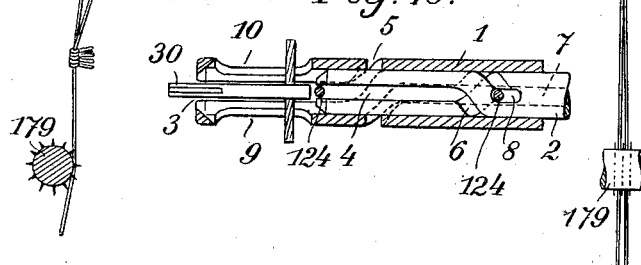

No. 732,216. PATENTED JUNE 30, 1903.
H. PANITSCHEK & J. AHORN.
LOOM FOR WEAVING PILE CARPETS.
APPLICATION FILED AUG. 19, 1899.
NO MODEL. 19 SHEETS—SHEET 17.
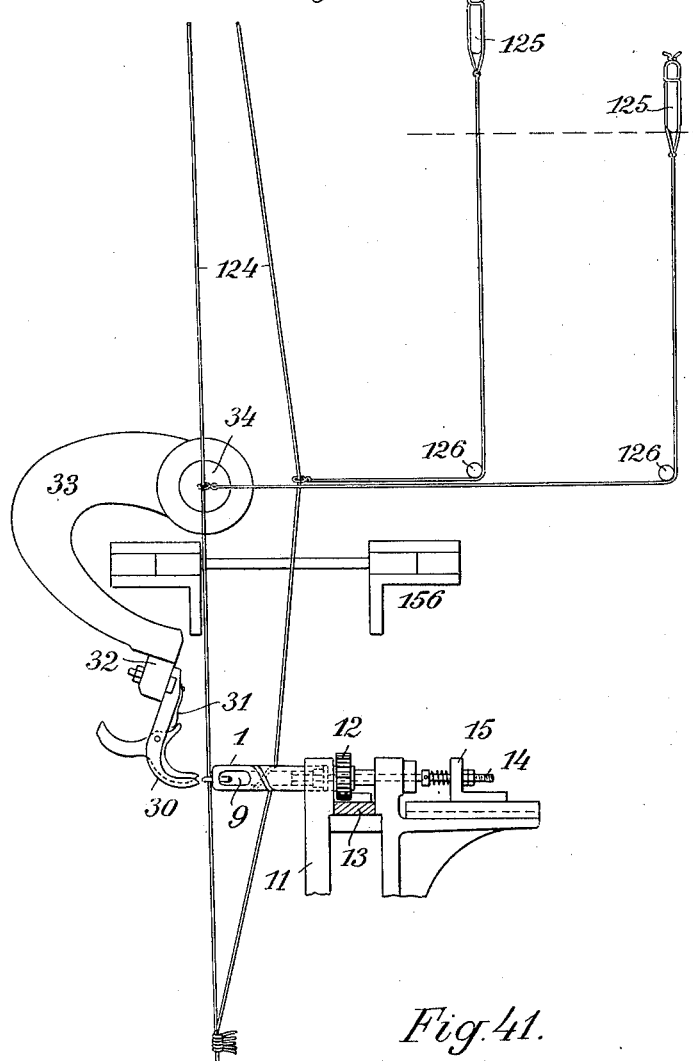
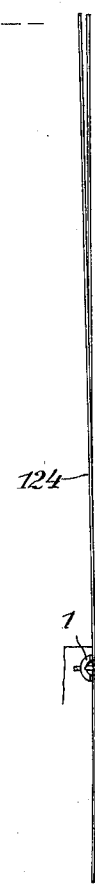
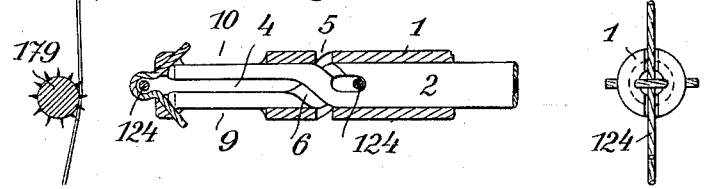
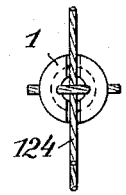

No. 732,216. PATENTED JUNE 30, 1903.
H. PANITSCHEK & J. AHORN.
LOOM FOR WEAVING PILE CARPETS.
APPLICATION FILED AUG. 19, 1899.
NO MODEL. 19 SHEETS—SHEET 18.
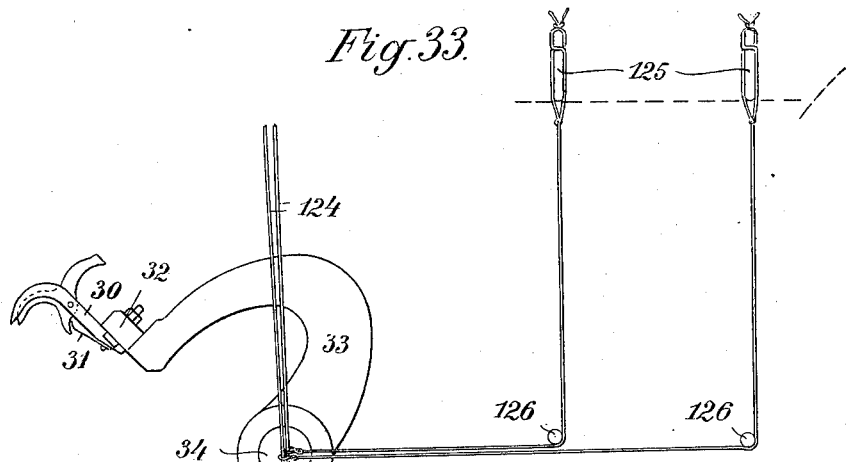
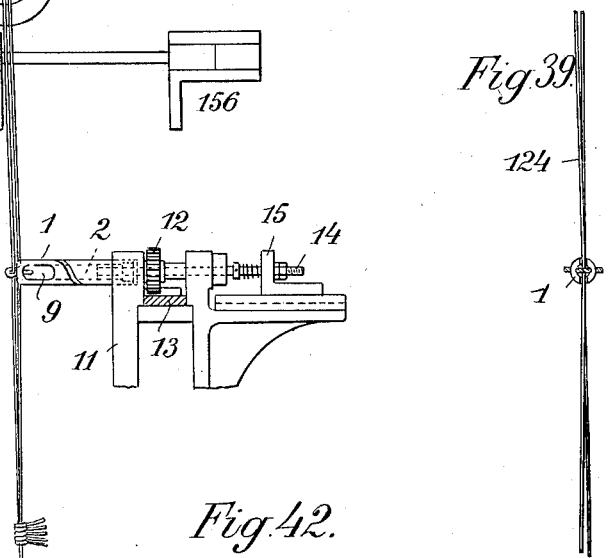
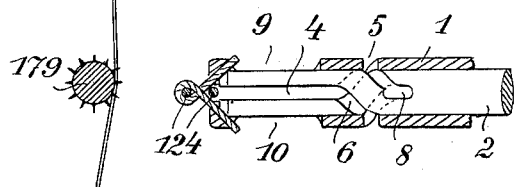

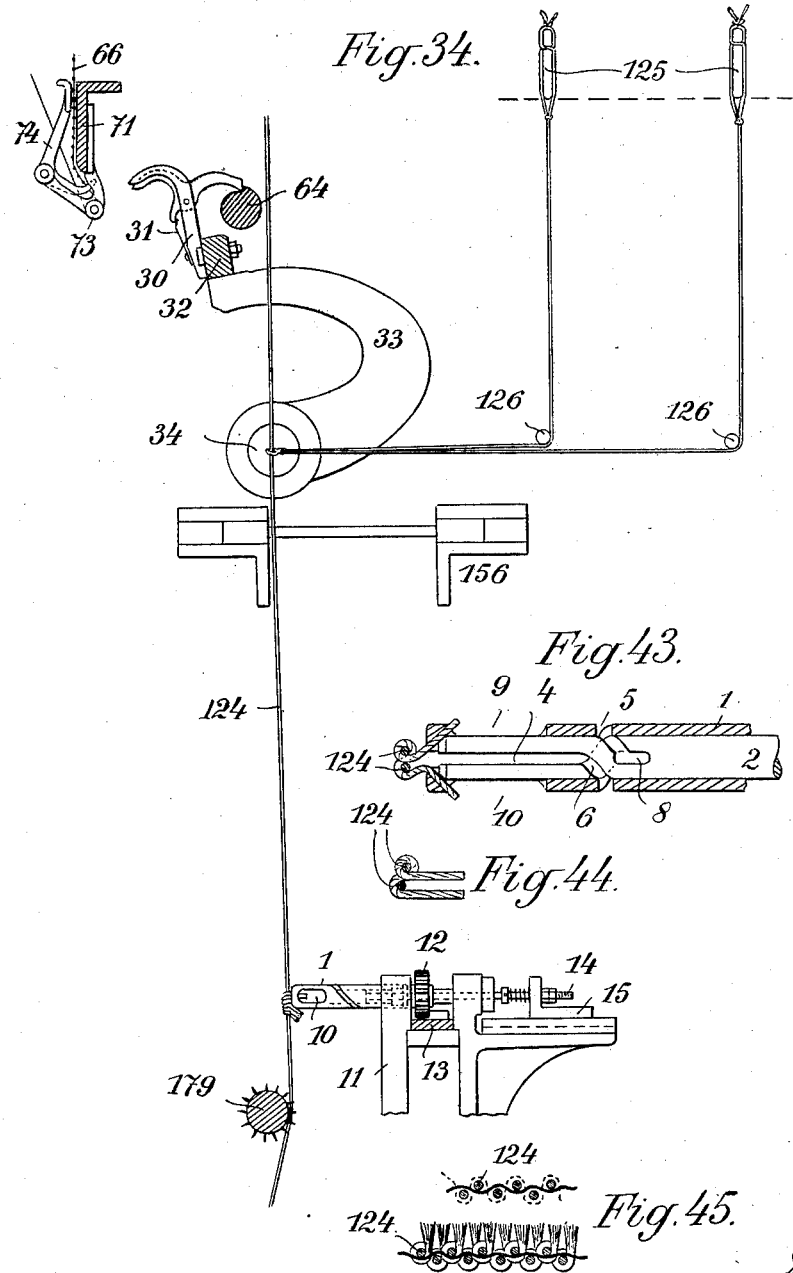

No. 732,216. Patented June 30, 1903.

UNITED STATES PATENT OFFICE.

HEINRICH PANITSCHEK AND JOHANN AHORN, OF SARAJEVO, AUSTRIA-HUNGARY.

LOOM FOR WEAVING PILE CARPETS.

SPECIFICATION forming part of Letters Patent No. 732,216, dated June 30, 1903.

Application filed August 19, 1899. Serial No. 727,820. (No model.)

*To all whom it may concern:*

Be it known that we, HEINRICH PANITSCHEK and JOHANN AHORN, subjects of the Emperor of Austria-Hungary, residing at Sarajevo, in the Province of Bosnia, in the Empire of Austria-Hungary, have invented certain new and useful Improvements in Looms for Weaving Pile Carpets; and we do hereby declare the following to be a full, clear, and exact description of the invention, such as will enable others skilled in the art to which it appertains to make and use the same, reference being had to the accompanying drawings, and to figures of reference marked thereon, which form a part of this specification.

The knotted carpets known under the name of "Smyrna" carpets are coarse long-piled carpets with a small number of knots per unit of area (twenty thousand to forty thousand knots per square meter) and correspondingly rough edges, while Persian carpets are distinguished by fineness, short pile, a large number of knots per unit of area, (up to five hundred thousand knots per square meter,) and ornamentation finished to the minutest details.

Knotted Persian carpets are, like knotted Smyrna carpets, made by hand labor by winding the figure or pile threads around and knotting them to the warp-threads by hand in the direction of the weft of the ground fabric. In doing this either the pile-threads are wound around a needle, so as to form rows of pile-loops, which are then cut by drawing out the needles, or short pieces of thread of about forty millimeters long are employed to produce the tufts or knots, (hereinafter called "knots,") which obviates the use of needles and the cutting of the rows of pile-loops. After a row has been knotted in the manner described the so-called "ground-pick" is inserted, which holds the several pile-threads fast and gives the proper firmness to the carpet.

An essential difference between the coarse and long-pile Smyrna carpets and the fine and short-pile Persian carpets consists in the formation of the knot. In the case of the Smyrna knot the small piece of wool is wound around the warp in the following way: The two ends of the piece for forming a knot are passed through between the pair of knot-threads to the surface of the carpet, (see Figure A of the accompanying drawings,) in consequence of which an uneven distribution of the pile takes place, since the pile of both ends passes to the surface between two warp-threads; but no pile passes to the surface between the adjacent warp-threads of two pairs of knot-threads. If now a carpet with such knots were cut very short, ribs would be produced, because the pile could not cover the intervals between the separate knots. It is otherwise in the case of the knot of the fine Persian carpet. In this case, as shown in Fig. B, an end of the pile passes upward between each two adjacent warp-threads, so that a perfectly uniform distribution of the pile on the surface of the carpet is produced. Knotted carpets produced in this way are of course costly on account of the protracted and troublesome hand labor and necessitate a considerable expenditure of wool.

Now this invention relates to a loom for producing fine Persian carpets in a mechanical manner in perfectly exact imitation of the handwork and while employing the knots characteristic of fine Persian carpets, and for thereby enabling these fine carpets to be produced considerably more quickly and cheaply. According to this invention any desired pattern can be produced without restriction as to the number of the colors and with less consumption of wool than in the case of carpets knotted by hand.

The invention consists, essentially, in that the small pieces of thread employed for producing the knots are drawn by means of tongs out of bands in which they are held in the order of color corresponding to the design to be produced and conducted by the said tongs to a number of pairs of knotting-tongs, which lay each piece of thread to be knotted in a curve around one of the threads of the pair of knot-threads and then twist the piece of thread around its warp-thread into the form of a loop, whereupon the second knot-thread, located behind the crossed loop ends, is loosened by the knotting-tongs, and the Persian knot is thus completed. The knotting-tongs are arranged on a rising and falling carrier by means of the lowering of which the finished knots are pushed up to the finished goods. By the repeated operation of the mechanism, which is adjusted at each time to the succeeding pair of warp-threads, all the pairs of warp-threads are in like manner provided with knots; but simultaneously the edge strips, also, are formed, for which purpose there are provided a small dobby for forming the shed and at each side of the loom a figuring-shuttle.

A knotting-loom made in accordance with this invention is represented in the accompanying drawings.

Figure 23:
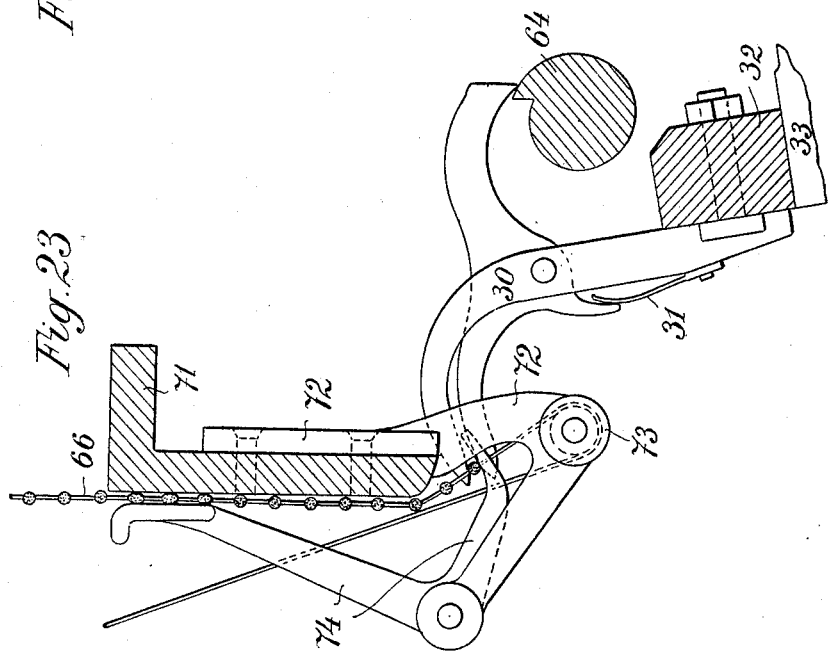

Fig. 1 thereof is a partially-sectional right-hand end elevation of the knotting - loom. Fig. 2 shows, to a larger scale, part of the coupling arrangements represented in Fig. 1. Fig. 3 is a vertical section taken just behind the right-hand standard of the knotting-loom, certain parts being broken away in order to render visible the parts behind the same and some of the parts lying in front of the plane of section being indicated in broken lines. Fig. 4 shows, in a second position and to a larger scale, certain parts of the lever arrangements shown in Fig. 3. Fig. 5 shows a vertical longitudinal section corresponding to the line A B of Fig. 1 through the right-hand portion of the loom. Fig. 6 shows a vertical longitudinal section corresponding to the broken line C D E F, Fig. 1, through the right-hand portion of the loom. The batten is omitted in the upper portion for the sake of clearness, and in the lower portion the parts belonging to the couplings and located in front of the plane of section E F have been drawn in. Fig. 7 shows in perspective some of the parts shown in Fig. 6. Fig. 8 is a front elevation of the right-hand portion of the loom in which several parts represented in the previous figures are for the sake of clearness omitted and the lower part of the knotting-loom is drawn in vertical longitudinal section according to the line G H of Fig. 3. Figs. 9 and 10 show, to a larger scale and respectively in front elevation and in vertical cross-section, the arrangement serving for the introduction of the ground-picks. Fig. 11 shows in perspective a portion of the thread-guiding device shown in Fig. 8. Fig. 12 shows a horizontal section corresponding to the line I K of Fig. 1, in which some of the lower coupling parts are omitted for the sake of clearness. Fig. 13 shows a horizontal section through the loom corresponding to the line L M N O, Fig. 1, in which all the working parts shown in Fig. 12 are omitted. Fig. 14 shows, to a larger scale, certain parts of the bevel-wheel arrangement shown in Fig. 13. Fig. 15 is a left-hand end elevation, and Fig. 16 a front elevation, of sufficient of the left-hand portion of the loom to show the figuring-shuttle device for producing the edge strips and also the picking arrangement for the device for inserting the ground-picks. Fig. 17 shows, to a larger scale, the figuring-batten together with shuttle in cross-section. Figs. 18 and 19 show, to a larger scale and respectively in end and side elevation, the reversing-coupling for the figuring-shuttle. Underneath these two figures the individual parts of the reversing-coupling are shown separately. Fig. 20 shows, to a larger scale, a portion of the apparatus shown in Fig. 1. Figs. 21 and 22 show, respectively in elevation and in plan and to a larger scale, the reversing-ratchet arrangement that brings about the lateral to-and-fro movement of the feeding-tongs, knotting-tongs, and the pattern-bands. Figs. 23 and 24 show, respectively in cross-section and in front elevation, the apparatus for feeding the pieces of thread for making the knots. Fig. 25 shows the upper part of the support with a pair of knotting-tongs in side elevation and partly in section. Figs. 26 and 27 show the outer part or cylinder of a pair of knotting-tongs in two different side views and partly in longitudinal section. Fig. 28 shows the inner part or piston of a pair of knotting-tongs in longitudinal section. Figs. 29 to 34 show a pair of feeding-tongs, a pair of knotting-tongs, and a pair of knot-threads in six different working positions to illustrate the mode of operation of the loom. Figs. 35 to 39 are the front elevations corresponding to Figs. 29 to 33. Figs. 40, 41, 42, and 43 show the pair of knotting-tongs, to a larger scale, in the working positions shown in Figs. 31, 32, 33, and 34. Fig. 44 shows a finished knot, and Fig. 45 shows, diagrammatically and otherwise, cross-sections through a finished knotted Persian carpet.

The knotting-loom possesses a number of cylindrical pairs of knotting-tongs, which consist of two parts 1 and 2, which are pushed one into another and of which the outer part 1 is a sleeve or cylinder open at the front, while the inner part 2 is a piston. Both parts are slotted in such a manner that the slot is, first of all, (at 3 or 4,) axial, in the further portion of its course (at 5 or 6) is wound helically through one hundred and eighty degrees, and, finally, (at 7 or 8,) is again, as at the beginning, executed axially in the case of the piston only for a short distance, but in the case of the cylinder for a farther distance, as clearly shown in Figs. 27 and 28. The piston is inclosed in the cylinder in such a manner that the former can be shifted axially to and fro, but cannot in relation to the cylinder be rotated. The cylinder has besides the described slot 3 5 7 also two lateral and diametrically opposite perforations 9 and 10. The pairs of knotting-tongs so constructed are mounted to rotate in a support 11, and each cylinder 1 is provided with a pinion 12. All the pinions engage in a common rack 13, which is arranged transversely to the loom and by shifting which all the pinions and also the pairs of tongs 1 2 are rotated through one hundred and eighty degrees. The backward extensions 14 of the pistons are mounted in a slide 15, which can be moved backward and forward and by the movement of which all the pistons can be shifted axially in the cylinders without impeding the rotation of any entire pair of tongs, as 1 2, (cylinder and piston,) as a whole. The support 11 is located, as shown in Figs. 1 and 30, in an ordinary dovetail-guide of the upwardly and downwardly moving carriage 16 and can be moved to and fro within the said guide laterally or transversely in relation to the loom.

The movement of the rack 13 for the purpose of rotating the pairs of knotting-tongs 1 2 is effected in the direction of the arrow in Fig. 13 from the main shaft 17 by means of the cam 18, Figs. 1, 3, and 12, the lever 19, the draw-rod 20, the chain 21, the vertical shaft 22, and the chain 23, which, as shown in Figs. 3, 8, and 13, directly engages the rack 13. The backward movement of the rack is effected by means of a spring 24, Fig. 6.

The to-and-fro movement of the pistons 2 for opening and closing the knotting-tongs is effected as follows: The carriage 15 is mounted so as to be capable of being moved on the support 11 and carries, as shown in Fig. 30, on its under side several short racks 25, in which engage the toothed sectors 27, keyed on the shaft 26. The shaft 26 is likewise mounted on the support 11, Fig. 8, and is rotated in the direction indicated by the arrow in Fig. 30 by means of a spring 28, which engages a flexible band 29, fastened to the shaft 26 in such a manner that the knotting-tongs are held lightly closed, the conical front end of each piston 2 being pressed against the hollow conical end of the cavity of the cylinder with moderate pressure.

The introduction of the small pieces of wool into the knotting-tongs is effected by means of the feeding apparatus, which consists of as many feeding-tongs 30 as there are knotting-tongs. The feeding-tongs, which are held closed by springs 31, are arranged on a rod 32, extending over the working breadth of the loom and held at the ends by curved arms 33. Each of the arms 33 is located on a short shaft 34, which is operated by means of chain-wheels 35 and chains 36 from the shaft 37, extending over the entire working breadth. This shaft receives its motion from the main shaft 17 through the crank 38, the connecting-rod 39, the roller-lever 40, and the eccentric 41, Figs. 1 and 6. When the tongs 30 are turned downward about the axis of the shaft 34, the ends of the tongs holding the small pieces of thread enter the corresponding knotting-tongs located in the upper extreme position. In consequence, however, of the fact that the slot in the piston 2 of each pair of knotting-tongs is narrower than the slot in the cylinder or than the breadth of a pair of feeding-tongs (see Figs. 27 and 28) the latter can enter the cylinder 1 of the corresponding pair of knotting-tongs, but cannot enter the slot of the piston, but strikes against the end of the piston and pushes the piston backward, the slide 15 likewise moving backward and the spring 28 being slightly compressed. As soon as the pair of feeding-tongs again leaves the pair of knotting-tongs the piston is pushed forward again by the spring and clamps fast the piece of thread, which passes with its ends through the perforations 9 and 10.

In order to prevent the pieces of wool from being torn out on the subsequent downward movement of the carriage 16, the piston receives a further forward pressure by means of the subsequently-described arrangement. On the shaft 37 there is located, as shown in Figs. 3 and 20, a curved arm 42, which carries a dog 43, which is held in a definite position by a spring 44. Since each pair of feeding-tongs also receives its motion, as described, from the shaft 37, the dog 43 is also moved backward simultaneously with the feeding of the small piece of thread, and it takes with it the three-armed lever 46 47 48, mounted to rotate on a projection 45, Figs. 3 and 5, of the frame of the loom by means of the arm 46 of the said three-armed lever, and thereby stretches the spring 49, which engages the three-armed lever at 47. The arm 42 has at the outer curved edge a screwed-on projection 50, which holds up a catch 51 until the spring 49 is almost completely stretched. Before, however, the spring 49 has been fully stretched the catch 51 is released by the projection 50, falls downward, and holds the lever-arm 46 fast after the spring 49 has been completely stretched, as indicated by dotted lines in Fig. 20. While the arm 46 moves back again with the dog 43, the knotting-tongs are also simultaneously closed, since the feeding-tongs have liberated the knotting-tongs, and the pistons can be moved forward by the tension of the spring 28. The projection 50, however, has come during the backward rotation of the arm 42 within reach of the catch 51 and has liberated it, and the three-armed lever 46 47 48 is turned by the spring 49 in the direction indicated by the arrow in Fig. 3. During this movement the eccentric head of the arm 48 strikes the crank 52, rigidly connected with the shaft 26, Figs. 3 and 4, in consequence of which the shaft 26 is rotated, the slide 15 is moved forward, and consequently the knotting-tongs are firmly closed, the springs 53 on the backward extensions 14 of the pistons being compressed. In order, however, to maintain the firm closure of the knotting-tongs also when the finished knots are pushed down to the fabric, the crank 52, which otherwise would leave the arm 48, and therefore move backward on the downward movement of the carriage, is prevented from turning backward by a nose 54 on a catch-lever 55, which is pivoted to the support, as shown in Fig. 4. The catch-lever 55 engages in the slotted rod 56, suspended from the three-armed lever 46 47 48, by means of a pin which moves downward in the slot of the bar 56 when the carriage 16 descends. Shortly before the finished knot is pushed down to the fabric the pin of the catch-lever 55 is held back by the lower end of the slot in the bar 56, in consequence of which the catch-lever 55 is turned upward, and its nose 54 liberates the crank-arm 52, the knot being pushed quite up to the fabric at this moment.

The up-and-down movement of the carriage 16 is effected from the main shaft 17 by means of the cam 57, Figs. 1, 5, and 12, the roller-lever 58, the draw-rod 59, the chain 60, the chain-pulleys 62, located on the shaft 61, and the chain 63. The opening of the feeding-tongs is effected by means of the tappet-shaft 64, Figs. 3 and 20, on which acts a spring 65, which has a tendency to rotate the shaft in the direction indicated by the arrow in Fig. 20. The backwardly-extending arms of the movable parts of the tongs strike during the backward movement against the tappets of the shaft 64, rotate this shaft against the action of the spring until these arms pass over the nose, and the latter again springs forward under the action of the spring 65. During the forward movement the said arms pass over the tappet-shaft. The feeding-tongs are thereby opened and are kept open until the arms have passed entirely over the nose, whereupon the tongs are again closed by means of the springs 31.

The bands 66, that contain the small pieces of thread to be knotted, are rolled up on the rollers 67, which are threaded upon a shaft 69, carried by the levers 68. On the pivotal shaft of the levers 68, which extends over the breadth of the loom, there are keyed two downwardly-extending arms 70, which have near their lower ends slots in which a rod 71 is mounted so as to be movable transversely in relation to the loom. On this rod, which, as shown in Fig. 8, consists of two pieces connected together, are screwed a number of bearing-arms 72, Figs. 1, 23, and 24, each of which carries two small cord-pulleys 73 and two angular feeding-levers 74. The short arm of each of these levers is forked in order to allow of the passage of the longitudinal threads (which hold the small pieces of thread) of the bands, while the longer and upwardly-extending arm has at its upper end a broadened head, which, as shown in Figs. 1 and 23, bears against the bar 71. Over the two-armed levers 74 are arranged two rollers 75, which extend over the breadth of the loom and are provided with toothed wheels and which are mounted in two swing-levers 77, located loosely on the shaft 76. The shaft 76 is mounted on the lever-arms 70, one of which on being swung forward operates, by means of a cord 78, fastened to the standard of the loom, a ratchet apparatus 79, by means of which the two rollers 75, whose toothed wheels gear together, are rotated backward in such a manner that the pattern-bands 66, carried over the pulleys 73 and rollers 75, are moved farther by the distance between two small pieces of thread, Fig. 1. The longitudinal threads remaining after drawing the small pieces of thread out of the pattern-fabric bands are conducted to a bobbin arrangement, Figs. 1 and 8, which is arranged over the rollers 75 and is fastened on the arms 70 and which has double as many bobbins 80 as there are pairs of knotting-tongs. The bobbins are loose on the spindles and are rotated merely by friction. They are driven by means of an endless chain 81 from the chain-wheel 82, which receives its rotation through the ratchet-wheel 83 and the pawl 84, carried by a ratchet-lever, which is connected by the rod 85 with the standard of the knotting-loom in such a manner that when the arm 70 swings forward the ratchet-pawl rotates the chain-wheel 82. From the chain-wheel shaft, by means of toothed gearing, (see Fig. 8,) a worm 86, and a worm-wheel 87, there is rotated a cam 88, on which slides the roller of a lever 90, which is fastened so as to rotate at 89 and whose longer arm carries a fork 91, in which is inserted the thread-guide 92, consisting of a rod, as shown in Fig. 11. As three such thread-guides are provided, there are also arranged three forked levers 90 91, which rise and fall simultaneously during the rotation of the cam 88. The middle thread-guide effects the winding up upon the two middle rows of bobbins, Fig. 1, and the two outer thread-guides that upon the two outer rows of bobbins.

By means of the rod 92*, the lever 93, and the connecting-rod 94 the motion of the right-hand forked levers 90 91 is transferred to the forked levers of the left-hand side of the loom.

The oscillatory motion of the arms 70 is obtained from the chain-wheel 35, located on the shaft 37. This chain-wheel carries a pin 95, Figs. 1, 6, and 20, which engages in the slotted lever 96 and oscillates the same. This motion is, as shown in Fig. 6, transferred farther to the arm 70 by means of the shaft 97, the lever 98, and the draw-rods 99, Figs. 1 and 20. In the framework of the loom there is further mounted to rotate a double-armed lever 100, whose longer front arm and whose shorter rear arm carry, respectively, two stepped abutting surfaces, Fig. 20, and a bolt, which bears against a projection of the curved piece 101, keyed on the shaft 97, and is consequently held in a definite position. When the arm 70 swings backward, at the end of its movement it is stopped by the first abutting surface 102 of the lever 100, while the draw-rod 99, in consequence of its longitudinal slot, can still continue its backward motion, during which also the curved piece 101 is further turned and liberates the lever 100, with its projection, in consequence of which the arms 70 become free and are swung backward by their own weight (toward the right in Fig. 1) until they become stopped by the second abutting surface 100 of the lever 100. (See position shown in Fig. 1.)

In order to bring the knotting-tongs, the feeding-tongs, and the bands always opposite to the pairs of warp-threads that are to be provided with knots and which are arranged vertically and close together, the said parts must be capable of being moved to and fro transversely in relation to the loom. This lateral motion is effected from the vertical controlling-shaft 104 and is transferred by means of a chain-wheel 105 and a chain 106, Figs. 6 and 12, to the support 11, and, further, by means of the chain-wheels 107 and chain 108, Fig. 6, to the angle-iron bar 109, which extends over the breadth of the loom and is mounted so as to be movable in the standards, and from this the said lateral motion is transferred, by means of the arm 110, to the rod 7, on which it bears, whereby the lateral movement of the pattern-bands 66 is produced.

The lateral movement of the feeding-tongs is, as shown in Fig. 20, effected by means of the angle-iron bar 109 in the following way: Each arm 111, (on each side of the loom,) which is connected with the angle-iron bar 109 and loosely surrounds the shaft 34, moves laterally during the shifting of the bar 109, the arms 33, the bar 32, and consequently the feeding-tongs.

The chain-wheel 105 for shifting the support is not rigidly keyed on the controlling-shaft 104, but is rotated thereby by means of sliding keys, because the chain-wheel moves up and down with the carriage 16.

The controlling-shaft must execute an oscillating movement in accordance with the lateral movement of the tong's apparatus and of the pattern-bands. This is effected by means of the following controlling arrangement:

The controlling-shaft 104 carries, as shown in Figs. 3, 6, and 12, a larger cone 113, which is connected by a chain with a smaller cone 114. On the shaft of this smaller cone is a ratchet-wheel 115, Figs. 21 and 22, which is rotated alternately in the one and the other direction from the main shaft 17 by means of the grooved cam-disk 116 and the two-armed slotted lever 117. For this purpose the slotted lever 117 is connected by means of the rods 118 with the corresponding ratchet-levers 119, whose pawls 120 engage alternately in ratchet-wheel 115. Since there should always be only one pawl acting, the secondly-liberated pawl must be engaged at the moment when the first is liberated, so that the ratchet-wheel and the parts in connection therewith will be rotated in the opposite direction to the previous rotation.

As mentioned in the commencement of this specification, the small pieces of threads are drawn out of the bands 66, and in connection with this after each knotting of a knot the tongs and the bands 66 are shifted laterally by the distance of the pairs of knot-threads from one another. When the last knot of a row has been knotted, the tongs and the bands have not to be pushed back laterally, as the first knot of the next row has to be knotted on the same pair of warp-threads as the last knot of the preceding row. If, therefore, each pair of knotting-tongs has, for example, to knot eight knots, the said parts (the tongs and the bands) need to be shifted only seven times, because they already stand at the correct place for the first knot of the succeeding row.

The reversing of the pawls 120 is effected as follows: The ratchet-wheel 115 carries two small disengaging pawls 121, which are under spring-pressure and which while ratchet action is proceeding approach the pawl for the time being in operation. As soon as one pawl 120—for example, the lower pawl in Fig. 22—is to cease to operate the corresponding—that is to say, next—disengaging pawl 121 has come so near to this pawl 120 that the former on the backward motion of the ratchet-lever 119 engages in the toothed arc 122, rigidly connected with the corresponding pawl, and pressed outward in the direction of the arrow, Fig. 22, and consequently disengages this pawl, while at the same time the second (upper) pawl is brought nearer to the controlling or ratchet wheel 115 in consequence of its jointed connection by means of the bent bar 123. During the next ratchet action the first (lower) pawl 120 is still further removed; but the other (upper) pawl 120 is brought into engagement with the controlling-wheel, in consequence of which, as is necessary, the tongs and the bands are shifted in a direction opposite to the previous one.

The displacement of the warp-threads 124 for the purpose of forming sheds is effected by means of the laths 125, Figs. 3 and 5, by means of leashes which are guided at right angles around the bars 126 and each of which engages with an eye, a warp, or knot thread 124. In order to keep the leashes guided horizontally toward the warp-threads in their positions and to prevent them from falling, each leash hangs with its eye on a holding-cord 127, Figs. 1 and 20, which is connected to the rod 128 common to all the holding-cords, as shown in Figs. 20 and 29.

The raising of the laths 125 is effected by means of chains carried over chain-wheels 129, Fig. 5, draw-rods 130, and chains 131 from the curved pieces 132, which are loosely threaded on the shaft 133 and are provided on the other side of the shaft with noses 134. Underneath the noses there is a card-chain 136, which passes over the cylinder 135 and whose cards act upon the pawls 137. When these pawls are raised by a card-pin, they engage under the corresponding noses 134 and effect when the levers 138, that carry the pawls 137, are turned toward the right, Fig. 5, a swinging of the corresponding curved pieces 132, that causes the raising of the laths, while the bent pieces, that correspond to the pawls remaining in the position of rest, are not shifted, and therefore the corresponding laths remain at rest. The pair of levers 138, carrying the pawls, are keyed fast on the shaft 133 and carry this along with them as they are swung, while a second pair of such levers 139, Fig. 1, are loose on the shaft 133, since the right-hand-side group of laths, Fig. 3, which belongs to this second pair of levers, are to be independent of the swinging of the shaft 133.

The strokes of the warp-threads 124 are of different lengths. During knotting they are less displaced in order not to liberate the finished knots that are pushed up to the fabric, while during the insertion of the ground-picks the warp-threads are displaced more and at a time at which the knotting devices and the main shaft 17 are at rest. As the two warp-threads of a pair of knotting-threads, as appears from the operation subsequently described, are not simultaneously raised, there are really provided two dobbies, which are independent of each other and of which each has its own operating-cam 140 or 141 located on the main shaft 17. During the knotting the laths are raised from the main shaft by means of the said cams 140 and 141, the two-armed levers 142, Figs. 1 and 5, the draw-rods 143, and the ratchet-levers 138 139. The first-displaced warp-threads of each pair of threads are operated by the cam 140, which corresponds to the left-hand-side group of laths, and the subsequently raised ones are operated by the cam 141, belonging to the right-hand-side group of laths.

For the formation of sheds for the ground-picks there are provided two special cams 144 and 145, Figs. 1 and 5, which effect a greater displacement of the warp-threads and which are keyed upon a common shaft 146 and likewise operate the levers 142. On this cam-shaft 146 there is rigidly secured a coupling part 147, Figs. 1 and 2, which is operated by the driving-wheel 149 in consequence of the engagement of the second coupling part 148. The coupling part 147, which is keyed fast, is provided with a projecting edge with four notches, which are arranged at angles of ninety degrees apart and in which engages a nose 151, projecting over from the disengaging lever 150, and also with two diametrically opposite noses 152. When the coupling part 148 (on the right hand in Fig. 1) is engaged, the nose 151 abandons the notch in the projecting edge of the coupling part 147, that is keyed fast. This coupling part continues to rotate, and since the nose 151 engages in a hook-like manner over the projecting edge of the fixed coupling part the coupling part 148 remains engaged until the next notch reaches the nose 151 and liberates this, in consequence of which the coupling is disengaged by the shifting of the loose coupling part 148 toward the right hand. On the first engagement of the coupling 147 148 the cam 145 comes into operation, in consequence of which the second (right-hand) group of laths is raised and remains in the raised position in order after knotting to allow the first of the ground-picks that are to be inserted to enter. When the first ground-pick has entered, then for the purpose of closing the shed the coupling part 148 is again engaged and is held by the nose 151, engaging over the edge of the fixed coupling part 147, until the next notch reaches the nose and the disengagement takes place. Immediately before this takes place, however, one of the noses 152 comes within range of the engager 153 of a second coupling 154 155, in consequence of which this is automatically engaged and effects the striking up of the pick that has been put in by means of the descending batten 156. The first-named coupling 147 148, on the contrary, remains at rest immediately after the engagement of the batten-coupling 154 155. The batten 156 receives its motion (as soon as the coupling 154 155 has been automatically engaged in the manner described) from the driving-wheel 157 by means of the following arrangement: The coupling part 154 is rigidly connected with a spur-wheel 158, which engages in a larger wheel 159, whose motion is transferred by means of the bevel-wheels 160 161, Fig. 13, to the shaft 162, and by means of this shaft the cam 163, the roller-lever 164, Fig. 3, the draw-rod 165, and the crank 166 to the rocking-shaft 167, which extends over the breadth of the loom, Figs. 1, 3, 12, and 13. On this shaft are rigidly keyed two arms 168, which are on opposite sides of the loom and which raise and lower the batten 156 by means of draw-rods 169 in the manner shown in Fig. 1. In order to enable one or two strokes, as required, to be given to the pick that has been inserted, the two bevel-wheels 160 and 161, Figs. 13 and 14, the diameters of which are related as two to three, have projecting edges provided with notches 170 and 171, respectively, in which engage the screws 172 173, respectively, of the disengaging lever 153, which can be rocked about 174, Fig. 13. On the engagement of the coupling 154 155 the screws are drawn out of the notches 170 171 in consequence of the shifting of the lever 153. During this the full edges over which the screws 172 173 engage prevent the backward movement of the lever 153 until both the screws after the rotation of the bevel-wheels simultaneously engage in the two slots. This does not occur, however, until the smaller bevel-wheel 160 has made three revolutions and the larger bevel-wheel 161 two revolutions, during which, consequently, two strokes of the batten have taken place. When, however, the screw 172 is removed out of the coupling-engager 153, this is held merely by the edge of the bevel-wheel 161 and is therefore freed on any rotation thereof, so that on the proper pick only one blow of the batten takes place.

The warp-threads 124 are wound upon two beams 175 and 176, Figs. 1 and 5, alternately, are led over the movably-mounted rollers 177 and 178, through the eyes of the leashes leading to the laths and over the temple 179, and finally reach the carpet-beam 180, whose pins engage the finished carpet and draw it along.

The warp-beams carry worm-wheels 181 and 182, respectively, Figs. 1 and 5, in which the worms 183 and 184, respectively, engage. These worms are loose on a common vertical shaft 185, which is driven by means of the bevel-wheels 186 187, whose motion is obtained from the driving-wheel 149 by means of the belt-pulley 188 and the belt 189. The worms are provided at the bottom with coupling halves, in which can engage the coupling parts 190 and 191, which are driven by the shaft 185 by means of sliding keys. In the coupling parts 190 and 191 engage the coupling-forks 192 and 193, which are connected, as shown in Fig. 5, by means of rods, with the tension-bar levers 194 and 195, which are loaded with weights. When the warp 124 is being worked forward and drawn along, the tension-bar levers 194 and 195 are displaced, and the coupling parts 190 and 191 are brought into engagement with the coupling halves on the worms 183 and 184. The warp is now wound off until the tension-bar levers are again turned back into their original position, and the coupling is consequently again disengaged.

The temple consists of a shaft 179, which extends over the working breadth of the loom and is provided with steel points and whose supporting-arms 196 are fastened on the shaft 197, which extends over the breadth of the loom and the outer frames of the standards. The shaft 197 is driven from the main shaft 17 by means of the roller-lever 198 and the cam 199.

The insertion of the ground-weft is effected by means of the shuttle 200, which, in accordance with the vertical position of the warp, must give off the weft-thread downward. The shuttle has on the one side a vertical and on the other side an inclined side wall, Fig. 10. In each of these side walls there are inserted two rollers, on which the shuttle slides through the shed between the walls of the shuttle-box 201, that are parallel to the shuttle-walls and the walls 202 of the batten 156. The movement of the shuttle is effected by means of the picker 203 and the picking-lever 204, which is moved quickly inward by means of a spring 205. On each side of the loom there is mounted to rotate on the standards such a picking-lever, which next to the pivotal bolt has a nose by means of which the picking-lever is carried outward by a lever 206, Fig. 8, which is mounted on the same pivotal bolt and is likewise provided with a nose. The spring 205 is thereby stretched. In the outer extreme position (when the spring 205 is stretched) the picking-lever is held fast by a catch 207, Figs. 10 and 11, which is provided on the shuttle-box 201, and whose second lever-arm is connected by means of a cord with a lath of the group of laths 125, that ascends during the formation of the ground-shed. As soon as the laths have reached their upper extreme position the catch 207 is liberated by the drawing of the cord, in consequence of which the spring 205 comes into operation and the shuttle is shot through the shed. The stretching of the picking-spring on the left-hand side of the loom is effected, as is apparent from Figs. 15 and 16, from the batten-shaft 167 by means of the slotted arm 208. On the shaft of the carpet-beam 180 there is a bent lever 209, whose upper arm engages in the slot of the arm 208 by means of a roller, while the second arm is connected by means of the connecting-rod 210 with the bent lever 211, from which the motion is transferred by means of noses to the left-hand-side picking-lever 204 and by means of the draw-rod 212 to the lever 206 and the right-hand-side picking-lever. The carpet-beam 180 is driven from the cam 213, Figs. 1 and 12, located on the main shaft 17, by means of a worm-regulator 267 of known kind.

The edge strips of the carpet are likewise made in a mechanical way. For the formation of the shed a small dobby is used, which consists of lifter-levers 215, which are loose on the shaft 214, Fig. 5, and which are connected by means of cords with the warp-threads belonging to the edge strips. The lifters are shifted by means of the cards of the card-chain 216, whose cylinder 217 is mounted on the one arm of a bent lever 218, which is located on the shaft 214, Figs. 1 and 5, and whose second arm is connected by means of a draw-rod 219 with a lever 220, which is pivoted to the standard and which by means of a sliding roller engages in a slotted lever 221. As this lever 221 is rigidly fixed on the shaft 133 of the curved lever 132, which causes the raising of the laths, the edge-strip dobby 214 218 is driven simultaneously with the large dobby 132 137. During the working of the ground-shed the edge-strip dobby should not work, and this is effected by means of blank cards—that is to say, cards that have no lifter-raising pins. For the insertion of the weft for the edge strips there is arranged at each side of the loom a figuring-shuttle 222, Figs. 15 and 16, in a movable shoe 223, Fig. 17, which incloses the shuttle only loosely and moves it to and fro in the slideway 224. The two shoes of the two sides of the loom are connected together by means of a rod 225, which receives its backward-and-forward motion from the shaft 37 of the tongs arrangement. For this purpose the following arrangement is provided: In the end pin of this shaft 37 there is screwed a sleeve 226, on whose turned-down necks are loosely placed two levers 227, which have at the inner end surfaces, which are turned toward each other, helical surfaces 228 and connected therewith in each case a shoulder 229, Figs. 18 and 19. The levers 227 are connected by means of rods 230 with the three-armed oscillating lever 231, whose middle arm carries, in common with an oscillating arm 232 of equal length, a connecting-rod 233, which engages the bar 225 by means of a fork 234 fastened to its inner end and moves it to and fro in its longitudinal direction, whereby the figuring-shuttle is moved. The sleeve 226 has between the two necks a sliding key for moving with it the sliding piece 235, which is placed upon it and which is provided at both sides with helical surfaces 236 and two shoulders 237, which correspond to the surfaces and shoulders of the lever 227. When the shaft 37 rotates in the direction indicated by the arrow in Fig. 18, then, according to the position of the sliding piece, one or other of the shoulders thereof—for example, the (in Fig. 19) right-hand-side shoulder 237—strikes against the shoulder 229 of the right-hand-side lever 227 and takes this with it in the direction of the arrow, whereby the lever 231 is finally brought into the position shown in Fig. 16. During the backward motion of the shaft 37 the (right-hand side) helical surfaces 228 and 236 slide apart, whereby the sliding piece is displaced axially and moved to the other (left-hand side) position. (Shown in Fig. 19.) If now the shaft is again rotated as at the commencement in the direction indicated by the arrow, the (left-hand side) shoulder 237 strikes against that of the left-hand-side lever and takes this with it in the direction indicated by the arrow, whereby the lever 231 is brought into the other extreme position. During the backward rotation of the shaft 37 the sliding piece 235 is again displaced toward the right-hand side, so that during the rotation of the shaft in the direction indicated by the arrow the first (right-hand side) lever is again taken along in the direction indicated by the arrow, and so on. The shuttle is therefore displaced as required alternately from right to left and from left to right.

The loom is started by engaging the main coupling 238 239, Figs. 1 and 12, arranged on the main shaft 17, by means of lever 240, the connecting-rod 241, Fig. 12, the bent lever 242, and the handle-bar 243. The motion of the coupling part 239 is transferred to the toothed wheel 149 by means of the train of wheels 244 245 157 and the coupling-wheel 247. The second coupling part 250, belonging to the coupling-wheel 247, is keyed on the main shaft 17 and rotates this by means of the sliding keys as soon as this coupling part 250 is pushed up to the coupling-wheel 247 by means of the disengaging lever 251. The coupling part 250 has, as shown in Fig. 12, at a definite position of its periphery a notch 252, in which engages the lug 253, which is fastened on the framework of the loom and holds the coupling fast as soon as it has been put into engagement while the main shaft makes one revolution, during which a knot is knotted. Since a row has a definite number of knots—for example, as assumed eight knots—therefore with this arrangement the loom would be stopped after each knot. In order to prevent this and to cause the loom to be stopped only after the knotting of the last knot of a row, the disengaging lever 251 is provided at its end, as shown in Figs. 6, 7, 12, and 22, with a fork 254, which has a wedge-shaped end which can be pushed under a knob 255, provided at the top of the pin 256, so as to raise the latter. This pin is loosely surrounded by the arm 257 of the bent lever 257 258, whose second arm 258 has a step which bears against a projection 261 of the disengaging lever 251, and therefore can hold this lever fast in the position in which the coupling 247 250 is engaged. The ratchet-wheel 115, Figs. 12, 21, and 22, carries two screwed-on noses 259 and 260, which at the conclusion of each row of knots alternately come within the range of the pin 256 and turn the bent lever, holding fast the disengaging lever, in the direction indicated by the arrow in Fig. 12, in consequence of which the disengaging lever 251 becomes free. On the disengagement of the coupling 250 (247) the disengaging lever 251 is moved in such a manner that the wedge-shaped fork 254 is pushed under the knob 255 of the pin 256, and this is raised and consequently brought outside the range of the nose 260, (259.) The bent lever 257 258 is thereby turned in the direction opposite to that indicated by the arrow in Fig. 12, so that it can again hold the disengaging lever 251 fast during the next engagement.

When the loom is at rest, the lug 253 is in engagement with the notch 252 in the coupling part 250, while the disengaging lever 251 is turned forward, (in Fig. 12 downward,) during which the lever-arm 258 of the bent lever 257 258 bears against the pin 261 in the disengaging lever 251, in consequence of the pull of the spring 262, connecting the arm 258 with the lever 251. When the loom is put into operation, by moving the disengaging lever 251 backward (in Fig. 12 upward) the coupling part 250 is likewise moved backward, (in Fig. 12 upward, in Fig. 1 toward the right,) and therefore comes out of engagement with the lug 253. Simultaneously the disengaging lever 251 is held fast by the falling in of the bent-lever arm 258. The coupling is now held fast, on the one hand, by means of the lug 253 and, on the other hand, by means of the disengaging lever 251. The movement of the working parts (tongs, &c.) for the purpose of adjusting them to the pair of warp-threads next to be knotted takes place immediately after putting the loom into gear. As, however, during the first revolution of the main shaft both of the pawls 120 are out of engagement with the ratchet-wheel 115, there is during the first revolution of the main shaft 17 still no shifting, as is necessary, because the first knot of the commencing row is to be knotted to the same pair of warp-threads as the last knot of the preceding row. There is no shifting in the corresponding direction until the second revolution of the main shaft. During the shifting for the last knot the lever 251 is disengaged by means of the ratchet-wheel 115 or the nose 260, and the loom would be stopped before the last knot is quite knotted. The premature stopping is prevented by means of the fixed lug 253, which keeps the loom in operation until the coupling part 250 reaches the lug 253, with its notch 252, and can stop the loom by the entry thereof under the influence of the spring 263. The operation of the disengaging lever 251 is effected by means of a double lever 264, Figs. 6 and 12, a draw-rod 265, and a double lever, with handle 266, Fig. 12. The warp-threads lying one behind another in the knotting-tongs lie in the finished fabric side by side, and the first warp-thread that is laid into the tongs is in the fabric the right-hand warp-thread and the secondly-inserted one the left-hand warp-thread of a pair of warp-threads, if the fabric be regarded on its rear side, which is turned toward the worker. In order to draw the finished knots down to the fabric, the carriage 16 is lowered with the support 11, during which a small displacement takes place between the knot and the pair of warp-threads belonging thereto in consequence of the stretching of the warp, so that when the knots have arrived below the two warp-threads are in the middle of the same, Fig. 34. The pair of threads already provided with knots no longer receive motion through the leashes during the knotting of the next knots, in consequence of which they are also not much loosened. When the pairs of knotting-tongs with the completely-wound knots have reached the already-finished fabric, the knots during the further downward motion of the carriage are firmly tightened. The knotting-tongs are then immediately opened and liberate the knots, whereupon the carriage descends again a still farther distance. In order to prevent during the upward movement thereof the rubbing of the knotting-tongs on the finished knots, whereby these might be loosened, the automatic temple 179 receives a small movement outward, (in Fig. 13 downward,) whereby the finished fabric is removed a little from the carriage, and this can rise without touching the goods.

The mode of operation of the knotting-loom described is as follows: Each warp-thread of each band 66 is carried through the slot of a feeling-lever 74, thence around the small pulleys 73, upward over the rollers 75, and onward to a bobbin 80. In consequence of the movement of the lever-arm 70 outward that has previously taken place the rollers 75 and also the bobbin arrangement have been moved on and the last and lowest small piece of wool of each band 66 has been pressed against the lower arm of the corresponding feeling-lever 74, the second lever-arm of each lever 74 being pressed against the band 66 and holding this fast. In the meantime the feeding-tongs 30 have reached their highest position, have opened during the commencing backward movement in consequence of the action of the tappet-shaft 64, and have each grasped a small piece of wool, whereupon they close during their further movement in the direction indicated by the arrow in Fig. 29, draw out the small pieces of wool from the bands 66, and feed these to the knotting-tongs 1 2. The carriage 16 has in the meantime arrived above and remains at rest. One of the warp-threads 124 of each pair of threads to be knotted has been drawn by a lath of the first (left-hand) group of laths into the helically-wound part 5 of the slot of the corresponding knotting-tongs, Fig. 30, whereupon this is rotated through one hundred and eighty degrees, and the warp-thread is drawn backward by the helical part 6 of the piston-slot a further distance, Fig. 31. The second warp-thread of the pair to be knotted is now introduced by a lath of the second (right-hand) group of laths into the groove of the knotting-tongs 1 2, which has been rotated through one hundred and eighty degrees.

The feeding-tongs 30, with the small pieces of wool, are in the meantime forced into the knotting-tongs and press the pistons 2 backward in the knotting-tongs, the small pieces of wool being inserted into the knotting-tongs. On the entry into the cylinder 1 of the knotting-tongs the ends of the small pieces of wool have been bent backward, but have immediately during the further movement of the feeding-tongs into the cylinder 1 straightened out again, owing to the perforations 9 and 10 in the cylinder, whereupon the feeding-tongs begin their backward movement, and the small piece of wool is carried backward with repeated bending in the opposite direction until the ends are pressed and held fast against the front walls of the cylinder by the piston of the knotting-tongs being drawn out during the further backward movement (out of the cylinder) of the feeding-tongs, by which they have been only loosely held, Fig. 32. At the same time the firm closure of the piston is effected by the pushing of the carriage 15 outward, whereby the small piece of wool is held still more firmly than is the case during the simple closure of the piston. The small pieces of wool are while being drawn out of the bands not engaged by the points of the feeding-tongs, but further backward thereof, in consequence of which each piece is held fast only at the ends by the pistons 2 (following the feeding-tongs) of the knotting-tongs, so that the middle portion of the small pieces of wool stands out of the knotting-tongs and forms a small bow, Fig. 41. This bow is necessary in order to enable a loop to be formed around the warp-thread during the subsequent twisting of the small piece of wool. When the small pieces of wool are held fast by the knotting-tongs, the second warp-thread (which is subsequently drawn into the knotting-tongs) of each pair of knotting-threads leaving the tongs is brought back into its original position, but is hindered in its further movement by the small piece of wool which is held fast by the knotting-tongs. As soon as the one warp-thread has left the knotting-tongs the latter is rotated backward again through one hundred and eighty degrees, in consequence of which the small piece of wool held fast by it forms a crossed loop around the warp-threads which have already left the knotting-tongs. The first warp-threads now return to their original position, and the knot is now ready to be drawn up to the finished fabric, Fig. 33. For this purpose the entire carriage 16, with the support 11, is moved downward, takes with it during this the finished knots, and pushes them firmly against the finished fabric. The catch-lever 55, Figs. 3 and 4, which holds the crank 52 fast, whereby the knotting-tongs are compelled to hold fast the knots, slides freely downward during this movement with its pin in the slotted rod 56 until the knots are drawn firmly against the fabric. At this moment the pin of the lever 55 has reached the end of the slot, in consequence of which the lever 55 is shifted, so that the crank 52 is disengaged and the knots are liberated out of the knotting-tongs. While the carriage 16 moves downward still farther the temple 179 moves outward with the finished fabric and remains in this position until the carriage during the next movement rises again and the knotting-tongs have passed the finished fabric without touching it. When the last knot of a row is knotted, the loom is automatically stopped by the disengagement of the coupling 247 250 and the carriage 16 remains in the lowest position, Fig. 29. During the knotting of one row of knots by means of the knotting-tongs there are simultaneously formed the edge strips of the carpet. The warp-threads thereof are displaced by the small dobby 214 219, and the weft is inserted by means of the shuttle 222. This work is executed by the loom at the moment at which the feeding-tongs insert the small pieces of wool into the knotting-tongs. For the purpose of inserting the ground-weft the coupling 147 148 is put into engagement, the cam 145 comes into action, and the second group of laths is raised and remains in the raised position, whereby the shed is formed. As soon, however, as the laths have reached the highest point the catch 207, which holds the picking-lever 204 with the spring 205 stretched, is liberated by one of them, and the shuttle is shot through the opened shed. Hereupon the coupling 147 148 is again put into engagement, in consequence of which the shed is closed; but simultaneously the batten-coupling 154 155 is put into engagement and the inserted pick is struck up to the finished knots of the last row by the lowering of the batten 156. In accordance with the adjustment of the machine one or two blows of the batten 156 are made, whereupon the coupling 154 155 is disengaged, and the batten remains in the raised position. In the same way in consequence of the repeated engagement of the coupling 147 148 there is effected the insertion of the second ground-pick, only with the difference that the first pick is inserted tight, whereas the second is inserted wavy, the wavy position of the pick being effected by hand. In consequence of the fact that the second pick is inserted slack the right-hand knotting-threads (warp-threads) come to stand behind the left-hand threads, as shown in Fig. 45, so that a firm knot results. Care must therefore be taken that the left-hand threads are always raised out with the first shed formation, so that the wound knots are not drawn tight until after the insertion of the first ground-pick, the right-hand threads being pressed backward by the tightly-inserted pick. If the other shed were first made, the right-hand warp-threads would pass before the left-hand ones, and the knots would therefore have little hold. The firmness of the knots depends, consequently, mainly upon the more or less tight insertion of the first pick, the correct shed formation, and the closeness of the warp. When the two ground-picks have been inserted, the knotting of the next row can be begun by engaging the coupling 247 250.

Knotting is effected in the manner described alternately, each row of knots being knotted in the opposite direction to the previous one and the ground-picks being inserted until the carpet is finished. According to this process, carried out with the help of the loom arrangements described, the turnout may be twentyfold that which has hitherto been produced by hand labor.

We claim as our invention—

1. In a loom, the combination with a batten, of knotting mechanism on one side thereof and means on the other side for feeding short pieces of thread and carrying them to the knotting mechanism, substantially as described.

2. In a loom, a warp-motion, means for feeding short thread to and feeding it around the warp-thread and looping it over an adjacent warp-thread, and mechanism for inserting the weft-threads, substantially as described.

3. In a loom, the combination with a vertically-movable batten, of knotting mechanism and feeding mechanism located above the batten rotatable to deliver short pieces of pile-thread to the knotting mechanism, said knotting mechanism timed to move in advance of the batten toward the finished fabric, substantially as described.

4. In a loom, the combination with a vertically-movable batten, of knotting mechanism located below the batten and devices located above the batten for seizing short pile-threads to deliver them to the knotting devices to be twisted about warp-theads, and means for laterally moving said devices above the batten and the knotting device to successively deliver pile-threads to successive warp-threads, whereby a row of knots are twisted, substantially as described.

5. In a loom, the combination with a vertically-movable batten, of a knotting device for a pair of warp-threads located below the batten, a feeding device above the batten for seizing and delivering short pile-threads to the knotting devices, one such feeding device and a knotting device to engage as many warp-threads as there are sets of pattern-points in the design, and means for laterally positioning the feeding and the knotting devices relatively to successive pairs of warp-threads, said knotting devices adapted to be vertically moved in advance of the batten, substantially as described.

6. In a loom, the combination with a batten, of knotting devices, feeding devices, means for shedding the warp to be engaged for the time being by the knotting devices, mechanism for delivering short pile-threads into the path of the feeding devices, means for moving the knotting devices to draw the finished knots to the fabric, means for shedding the entire warp to insert weft-threads and figuring-shuttles at the side of the warp to weave the edge strips, and shedding mechanism operated to shed the warp-threads of the edge strips before the entire warp is shed, substantially as described.

7. In a loom, mechanism for feeding strips of a pattern fabric cut in the direction of its warp, mechanism for picking from said strips the short weft-threads and for feeding the same to the warp-threads of the loom, means for knotting said short threads around the latter warp-threads, substantially as described.

8. In a loom, in combination with mechanism to feed strips of a pattern fabric cut in the direction of its warp, of means for withdrawing the weft-threads from said pattern fabric and knotting them around one and looping them around an adjacent warp-thread, mechanism for inserting a weft and mechanism for winding up the warp-threads of the pattern fabric, substantially as described.

9. In a loom, in combination with a warp mechanism, of means for feeding strips of pattern fabric cut into strips in the direction of its warp, knotting devices organized to receive and withdraw one set of warp-threads from the closed shed, fingers organized to seize short weft-threads of the pattern fabric and feed them with the other set of warp-threads to the knotting devices, means for moving said mechanism with its pile toward the finished fabric and then releasing it, and mechanism for picking in a weft in opposite directions, and means for returning the knotting mechanism into operative position, substantially as described.

10. In a loom, a pile-inserting mechanism comprising means for feeding a pattern fabric cut in the direction of its warp, knotting devices on one side of the warp and fingers on the other organized to seize the weft-threads of the pattern fabric and coöperate with the knotting devices to knot the weft-thread of the pattern fabric around one and loop it around another warp-thread, and mechanism for moving the pattern fabric, and knotting and looping mechanism in a direction across the warp to engage another set of warp-threads, substantially as described.

11. In a loom, the combination with a batten, of knotting devices, mechanism for feeding strips of a pattern fabric comprising warp-threads and short weft-threads to form the pile in the finished fabric, feeding devices operated to draw the short weft-threads from said pattern fabric and deliver them to the knotting devices below the batten, means for shedding those warp-threads engaged for the time being by the knotting devices, mechanism for laterally moving the feeding mechanism, the knotting devices and the mechanism for feeding the pattern fabric to form pile around successive pairs of warp-threads, substantially as described.

12. In a loom, the combination with a batten, of knotting devices, mechanism for feeding strips of a pattern fabric comprising warp-threads and short weft-threads to form pile of a carpet, feeding devices operated to draw the short threads from the pattern fabric and feed them to the knotting devices located below the batten, means for temporarily shedding the warp acted upon at the time being by the knotting devices and for shedding the entire warp to insert weft-threads, and figuring-shuttles at the sides of the warp to weave in binding edges operated from the feeding mechanism, substantially as described.

13. In a loom, the combination with a pile-inserting and shedding mechanism, of a take-up and let-off motion, means for causing a partial shed toward the pile-inserting mechanism, and auxiliary means for forming a complete shed after the pile has been formed, substantially as described.

14. In a loom, a knotting device comprising a pair of tongs, a second pair of tongs reciprocable within the former and means for rotating the first-mentioned pair of tongs on the second pair, substantially as described.

15. In a loom, in combination, a pair of tongs, a pinion thereon for rotating them, a pair of tongs longitudinally movable in the first-mentioned ones and coöperating with the ends of the latter to hold a pile-thread, substantially as described.

16. In a loom, in combination, a pair of tubular tongs having perforations in their members, a pinion thereon for rotating them, a pair of piston-tongs longitudinally movable and spring-held in the tubular tongs, substantially as described.

17. In a loom, in combination, a pair of tubular tongs, whose members have a twist of one hundred and eighty degrees, and are each provided with a perforation near their ends, a pinion on the tongs to rotate them, a pair of piston-tongs, whose members also have a twist of one hundred and eighty degrees, and means for longitudinally moving the latter and a rack for rotating the former, substantially as described.

18. In a loom, in combination, a pair of tubular tongs internally contracted at their points, having a perforation in each member and a twist of one hundred and eighty degrees, a pair of piston-tongs, whose members also have a twist of one hundred and eighty degrees, nearer the junction of said members and longitudinally movable within the former tongs, springs to force the piston-tongs forward to hold a pile-thread between their ends and the contracted ends of the tubular tongs, and means for rotating the former and reciprocating the latter tongs, substantially as described.

19. In a loom, in combination, pairs of tubular tongs, a pinion on each pair, a slide, a pair of piston-tongs coöperating with each pair of the former ones to hold a pile-thread yieldingly mounted in the slide, whereby said piston-tongs are all simultaneously longitudinally moved, a rack engaging the pinions on all the cylinder-tongs, whereby the latter are all simultaneously rotated, and means for locking and holding said coöperating pairs of tongs and a slide locked in forward position until the pile-threads are moved to the fabric, substantially as described.

20. In a loom, in combination, pairs of tubular tongs, each member thereof having a lateral perforation and a twist of one hundred and eighty degrees, a pinion on each pair, a slide, a pair of piston-tongs longitudinally movable in each pair of cylinder-tongs and the members of which also have a twist, said piston-tongs mounted in said slide, a coil-spring on the stem of each pair of piston-tongs to hold them yieldingly in the slide, means for moving the slide, a rack to simultaneously rotate the pinions, and means for locking said slide and holding the tongs in coöperative relation until the pile-threads held by the latter are moved to the fabric, substantially as described.

21. In a loom, the combination with knotting devices on one side of the warp, of a cam-shaft and tongs on the other side of the warp, said cam-shaft arranged to operate the tongs to seize properly-positioned short pile-threads and means to move the tongs to deliver said pile-threads to the knotting devices, substantially as described.

22. In a loom, the combination with knotting devices, of a spring-held cam-shaft, as many feeding devices as there are knotting devices, each comprising a fixed member and coöperating spring-held member, a shaft to rotate said feeding devices, the tail of said spring-held member arranged to rotate the cam-shaft against the spring tension to ride over the cam and be held open thereby, substantially as described.

23. In a loom, the combination with knotting devices, of short shafts at each side of the loom, a curved arm secured to each of said shafts, a rail extending between their ends, a cam-shaft, a member secured to said rail, a member pivoted to the first-mentioned one having a tail extending back of the fixed member and spring-held, a spring-held cam-shaft, said tail arranged to rotate said cam-shaft and ride over the cam-surface and thereby held open by the shaft, substantially as described.

24. In a loom, the combination with laterally-shiftable knotting devices; of short shafts at each side of the loom, curved arms secured to each short shaft, a rail carried by said arms, as many feeding devices secured to said rail as there are knotting devices, a cam-shaft located to operate the feeding devices to seize short pile-threads, and means for laterally moving the short shafts and rail and the cam-shaft the same extent as the knotting devices, substantially as described.

25. In a loom, the combination with knotting devices and feeding devices; of a rod, bearing-arms secured to said rod, a bent feeding-lever pivoted in said arms and adapted to hold a strip of pattern fabric between one of said levers and the rod while a pile-thread is being withdrawn by the feeding devices, substantially as described.

26. In a loom, the combination with knotting and feeding devices laterally movable; of a rod, bearing-arms secured to said rod, a pair of bent feeding-levers pivoted in one end of each arm, said levers having a broad flat end and a forked end, cord-pulleys journaled on each side of the bearing-arms, the forked end of said lever arranged to embrace a pair of twisted warp-threads of a pattern fabric to be rotated when the feeding mechanism pulls a pile-thread held by them out of the pattern fabric and moving the flat arm to hold the pattern fabric against said rod, substantially as described.

27. In a loom, the combination with knotting and feeding devices laterally movable, and means for rotating the feeding devices; of a rod, bent bearing-arms having one end secured to said rod, a cord-pulley journaled at each side of said bearing-arms at the bend thereof, a bent feeding-lever pivoted at each side of the end of said arms at their free ends, said lever having a broad flat end on one arm and a fork on the other arm, whereby each forked end will embrace warp-threads of a pattern fabric, and will be rotated when said feeding devices are rotated to draw a pile-thread out of the pattern fabric, thereby causing the flat end of said lever to hold the pattern fabric against said rod, means winding up the warp-threads after passing over said cord-pulleys and means for laterally shifting the said rod and the parts carried thereby, substantially as described.

28. In a loom, the combination with knotting and feeding devices laterally movable with respect to a warp, means for rotating the feeding devices; of a rod, arms having one end secured to said rod, a bent lever and a cord-pulley journaled on each of said arms, said bent lever having one end coöperating with said rod to hold a pattern fabric, and a forked end to embrace warp-threads of said fabric, means for winding up said warp-threads passing over said pulleys and means for laterally moving the rod and the parts carried thereby to the same extent as the feeding and knotting devices, whereby pile-threads are drawn by the feeding devices from the pattern fabric and presented to the knotting devices and successive points of the warp, substantially as described.

29. In a loom, the combination with feeding and knotting tongs and means for feeding a pattern fabric in the path of the former; of a reciprocable lever, pawls operatively connected to the lever and to each other, a ratchet-wheel acted upon by said pawls, a shaft flexibly connected to the ratchet-wheel to be moved in opposite directions by said ratchet-wheel and to simultaneously shift the feeding and knotting devices one point in the pattern, and means for transmitting said lateral movement to the pattern-fabric-feeding means, substantially as described.

30. In a loom, the combination with a rail, feeding-tongs thereon, a vertically-movable carriage, knotting-tongs therein and means for feeding a pattern fabric; of a reciprocable lever, pawls operatively connected to said lever and to each other, a ratchet-wheel acted upon by said pawls, means for disengaging each pawl from the wheel after a definite number of points in the design have been made, a shaft flexibly connected to and rotated in opposite directions by said ratchet-wheel, flexible connections between said shaft and carriage and rail to laterally shift them one point of the design at a time, and arms projecting from said rail to likewise shift the means for feeding the pattern fabric, substantially as described.

31. In a loom, the combination with feeding and knotting mechanisms and means for feeding a pattern fabric; of a controlling-shaft operatively connected to said mechanisms, a reciprocated lever, a ratchet-wheel, ratchet-levers operatively connected to the reciprocated lever, pawls connected together pivoted in the ends of the ratchet-levers and having ratchet-tails, disengaging pawls on the ratchet-wheel located to be operatively moved into engagement with the ratchet-tails, and means for transmitting motion from the ratchet-wheel to said shaft, whereby all of the mechanisms are moved to form successively a predetermined number of points of the design in one direction and then the same number in the reverse direction, substantially as described.

32. In a loom, the combination with feeding mechanisms, a carriage containing knotting mechanisms and means for feeding a pattern fabric; of a main shaft, means for vertically moving said carriage from the main shaft, a controlling-shaft, a lever actuated from the main shaft, a ratchet-wheel, ratchet-levers operatively connected to said lever, pawls connected together, having ratchet-tails and pivoted on said ratchet-levers, spring-held disengaging pawls on the ratchet-wheel to engage the ratchet-tails to throw the first-mentioned pawls out of engagement with the ratchet-wheel, said ratchet-wheel adapted to communicate motion to the controlling-shaft and coupling, comprising a driven part and clutch adapted to engage therewith, the movement of said clutch controlled by the ratchet-wheel, substantially as described.

33. In a loom, the combination with the main shaft and a driven wheel loose thereon; of a clutch to engage said wheel to drive the shaft, a controlling-shaft, knotting mechanism shifted laterally from said controlling-shaft, ratchet mechanism operated from the main shaft to move the controlling-shaft to successively position the knotting mechanism and a lever to actuate the clutch and operated by the ratchet mechanism to hold the clutch in operative position during the knotting of the required number of points in the design, substantially as described.

34. In a loom, the combination with knotting mechanism laterally shiftable; of laths, a leash for each warp-thread, the leashes of the warp-threads to be simultaneously moved, connected to a single lath, a sector to actuate each lath, a pawl arranged to take under one end of each sector, cards to operatively position the pawls relatively to the sector ends and means for revolving the pawls, whereby the proper pairs of warp-threads are drawn into the properly-positioned knotting mechanism, substantially as described.

35. In a loom, the combination with knotting mechanism laterally shiftable; of laths, a leash for each warp-thread, all of the leashes of the warp-threads to be simultaneously moved, connected to a single lath, a shaft, sectors loose thereon, each sector operatively connected to a lath, pawls journaled to be rotated on points and revolved around said shaft, and a card chain to operatively position the pawls relatively to the sectors, whereby the proper lath is moved to bring selected pairs of warp-threads into engagement with the knotting mechanism, substantially as described.

36. In a loom, the combination with a main shaft, knotting mechanism laterally shiftable, of leashes for each warp-thread, a shaft, a lever-arm connected thereto, sectors loose on said shaft, each sector operatively connected to the leashes that operate those warp-threads simultaneously moved toward the knotting mechanism, pawls carried by said lever, loosely pivoted and adapted to be revolved about said shaft, and a card chain adapted to selectively position the pawls to operate the sectors, cam-operated means driven from the main shaft to move said lever, substantially as described.

37. In a loom, the combination with the batten, a main shaft and knotting mechanism; of means for shedding the warp to be engaged by the knotting mechanism, devices to actuate said shedding means from said main shaft, means for actuating the batten automatically coupled by said means to actuate the shedding mechanism, substantially as described.

38. In a loom, the combination with feeding and knotting mechanisms; of a pair of pendent arms, means for feeding strips of a pattern fabric, said feeding mechanism carried by said pendent arms, means for moving the arms to and fro, devices for winding up the longitudinal threads of the pattern fabric after pile-threads are withdrawn therefrom, and a ratchet mechanism to operate the winding devices moved at each to-and-fro movement of said arms, substantially as described.

39. In a loom, a frame, feeding and knotting mechanisms; of a pair of pendent arms, means for moving the arms to and fro, means for feeding strips of pattern fabric carried by said arms, devices for winding up the longitudinal threads of said pattern fabric after pile-threads are withdrawn, a ratchet mechanism, a pawl to operate it connected to the frame, thread-guides elevated and depressed by the ratchet mechamism, whereby said winding devices and guides are moved at each to-and-fro motion of said arms, substantially as described.

40. In a loom, a frame, feeding and knotting mechanisms; pivoted arms, means for moving the arms to and fro, means for positively feeding strips of pattern fabric into the path of the feeding mechanism, a ratchet, and a ratchet-lever connected to the frame, winding-bobbins supported from said arms, a ratchet mechanism to operate the bobbins, and thread-guides elevated and depressed from the ratchet mechanism, whereby the bobbins and the means for feeding the pattern fabric will be operated by the to-and-fro movement of said arms, substantially as described.

41. In a loom, knotting-tongs, a rock-shaft, feeding devices for feeding pile-threads to the knotting-tongs and operated by said rock-shaft, and figuring-shuttles at each side of the loom operated from said rock-shaft, substantially as described.

42. In a loom, main shedding mechanism, knotting-tongs, a rock-shaft, feeding devices for feeding pile-threads to the knotting-tongs, figuring-shuttles, means for shedding the warp operated upon by the figuring-shuttles, and a connecting-rod parallel with the rock-shaft and means for automatically reciprocating the rod to move the shuttles, said means for shedding the warp operated upon by the figuring-shuttles driven from the main shedding mechanism, substantially as described.

43. In a loom, a main shedding mechanism, a rock-shaft, levers loose thereon having cam-faces, a slidable cam between the levers to alternately engage the cam-faces, a three-armed lever actuated by the first-mentioned one, a shuttle-carrier, a connecting-rod between the three-armed lever and the shuttle-carrier, card mechanism for operating the warp actuated upon by the shuttle, said card mechanism operated from the main shedding mechanism, substantially as described.

44. In a loom, a main shedding mechanism, a rock-shaft, a vertically-movable carriage, knotting-tongs therein, a shuttle-carrier at each end of the carriage, a rock-shaft, cam-operated levers on the shaft, a three-armed lever vibrated by the first-mentioned ones, a connecting-rod actuated by the three-armed lever and yoke to engage the end of the shuttle-carrier to reciprocate the latter and means for shedding the warp acted upon by the shuttles and driven from the main shedding mechanism, substantially as described.

45. In a loom, the combination with feeding-tongs and knotting-tongs; of shedding mechanism to form a partial shed to enable pairs of warp-threads to be successively shed to said tongs, substantially as described.

46. In a loom, the combination with feeding-tongs and knotting-tongs; of a rock-shaft to operate the feeding-tongs, figuring-shuttles at each side of the warp to weave edge strips actuated from said rock-shaft, means for laterally shifting the feeding and knotting tongs, and shedding mechanism to shed successive pairs of warp-threads and the threads of each pair successively to the knotting-tongs, substantially as described.

47. In a loom, the combination with vertically-arranged warp-threads, of a shedding mechanism, a take-up and let-off motion, operated from the shedding mechanism, a shuttle, roller-bearings on its sides and organized to let off weft downwardly and a batten operated to draw the weft downwardly to the finished fabric, substantially as described.

48. In a loom, the combination with pile-inserting mechanism and a shuttle-motion, of auxiliary motions at each side of the loom and timed to operate intermediate the main picks, substantially as described.

49. In a loom, the combination with pile-inserting mechanism and a shuttle-motion, of auxiliary shuttles and operating mechanism at either side of the loom, means for connecting the auxiliary shuttle-operating mechanism and means for driving them from the pile-inserting mechanism, substantially as described.

50. In a loom, means to position short sections of pile-threads arranged vertically in the order that they will occur transversely in the finished fabric, knotting mechanism and feeding mechanism to seize the pile-threads and deliver them to the knotting mechanism to draw the pile to the finished fabric in advance of the batten, a temple to normally hold the warp toward the knotting mechanism and to release it after the knot has been positioned, and means to insert weft-threads, substantially as described.

In testimony that we claim the foregoing as our invention we have signed our names in presence of two subscribing witnesses.

HEINRICH PANITSCHEK.
JOHANN AHORN.

Witnesses:
CARL MEROHET,
W. DRAHAKÖUPT.